(12) United States Patent
Chance et al.

(10) Patent No.: US 6,654,788 B1
(45) Date of Patent: Nov. 25, 2003

(54) METHOD AND APPARATUS INSURING REGULATORY COMPLIANCE OF AN ENTERPRISE MESSAGING SYSTEM

(75) Inventors: Curtis Chance, Phoenix, AZ (US); Lynn Scwartz, Phoenix, AZ (US); Bruno Sarda, Benecia, CA (US)

(73) Assignee: Charles Schwab & Co., San Francisco, CA (US)

( * ) Notice: Subject to any disclaimer, the term of this patent is extended or adjusted under 35 U.S.C. 154(b) by 0 days.

(21) Appl. No.: 09/569,546

(22) Filed: May 12, 2000

(51) Int. Cl.[7] .............................................. G06F 15/16
(52) U.S. Cl. ........................ 709/206; 709/201; 709/232
(58) Field of Search ................................ 709/206, 201, 709/204, 232

(56) References Cited

U.S. PATENT DOCUMENTS

| | | | |
|---|---|---|---|
| 5,887,171 A | * 3/1999 | Tada et al. | 709/317 |
| 6,012,083 A | * 1/2000 | Savitzky et al. | 709/202 |
| 6,032,192 A | * 2/2000 | Wegner et al. | 709/238 |
| 6,424,997 B1 | * 7/2002 | Buskirk et al. | 709/206 |
| 6,449,646 B1 | * 9/2002 | Sikora et al. | 709/226 |

* cited by examiner

Primary Examiner—Krisna Lim
(74) Attorney, Agent, or Firm—Glenn Patent Group; Michael A. Glenn

(57) ABSTRACT

An apparatus and a method for insuring compliance of a regulatory rule set for messages generated by at least one agent of the enterprise. The method comprises the steps of: a) providing a Messaging interface used by an agent containing at least one field accessing a message queue which is based upon the agent to create the regulatory analysis message; b) identifying issues regarding the regulatory analysis message to create an issue collection containing at least one issue; c) responding to each of the issue contained in the issue collection to create an issue response for each issue; and d) creating the regulatory analysis message based upon the issues responses for each of the issues of the issue collection.

43 Claims, 22 Drawing Sheets

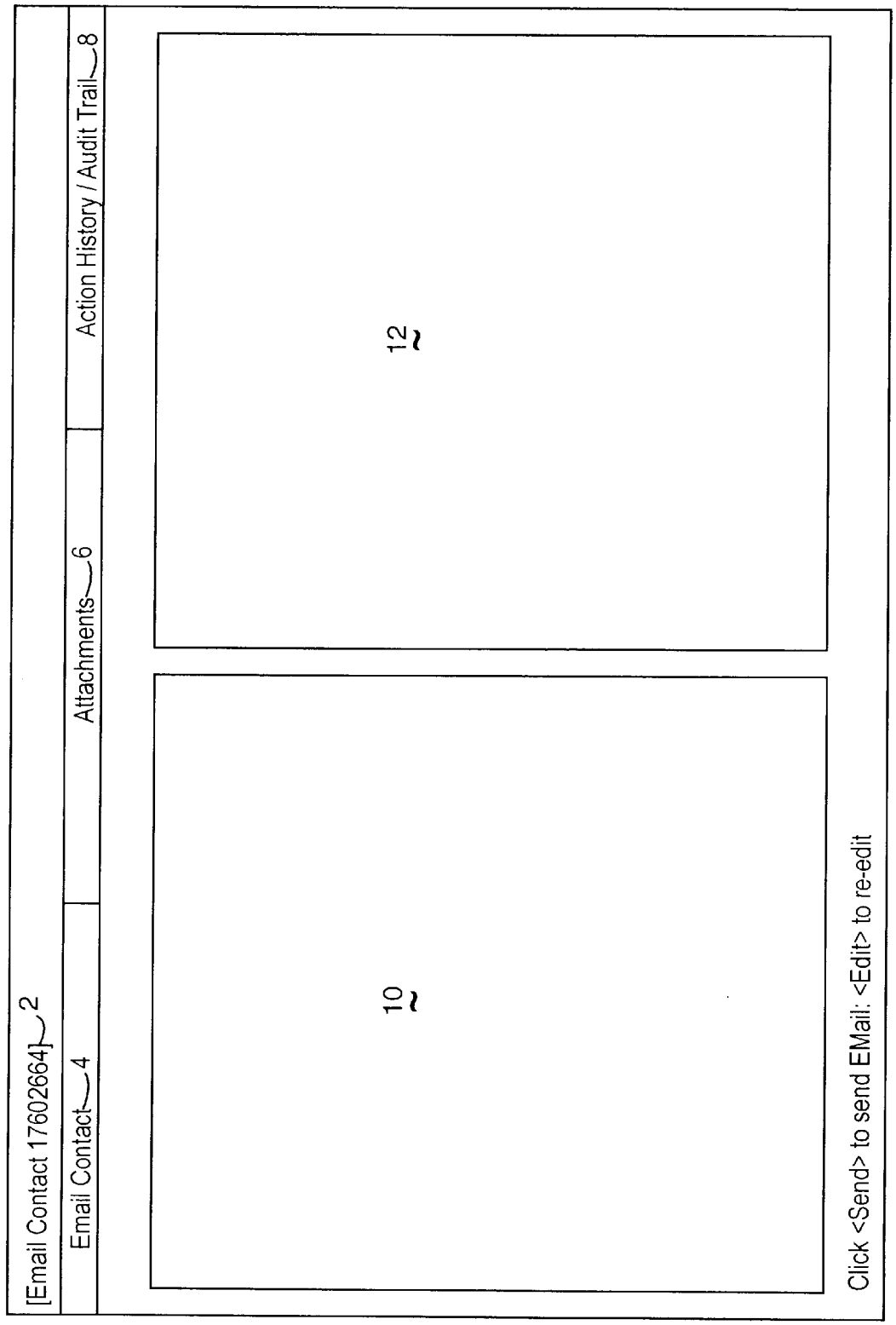

[Email Message 17682664] — 2

Email Message — 4

ACCOUNT
Number [ 20 ▽ ] Tax Id [ 22 ] Segment [ 24 ]
Registration [ 26 ]

Individual
Name [ 28 ▽ ] Tax Id [ 30 ]

Details
Direction [ Outbound ] — 32  Assigned To [ agent1 ] — 34  Suped By [ 36 ]
Status [ In Process ▽ ] — 38  MessageAge [ 04/06/2000 18:26:51 ] — 40
Reply For [ ] — 42  Product [ ] — 44  Created in Error [ ] — 46

100 — [ Compose ] — 102  [ Edit ] — 104  [ Spell check ] — 106  [ New Rev ] — 108  [ Send ]

To Address [ individual1@xyz.zyx ▽ ] — 110
Return Addr [ WebTrading@Schwab.COM ] — 112    #Attachments [ 0 ] — 116
Subject [ ] — 114

EMail Body
```
Dear Individual One:
                                     120
Thank you for your e-mail
Case #165455925    Password Reset If you have further questions or concern. please do not hesitate to contact us.
Thank you for using Schwab's Electronic Brokerage Services.

Sincerely,
Agent One
Schwab Email Customer Service
http://www.schwab.com
(c)2000 Charles Schwab & Co., Inc., member SIPC/NYSE
```

| Acount Messages-101 items | | | | |
|---|---|---|---|---|
| Created On | Message ID | Channel | Direction | Status |
| 04/10/2000 1 | 17782667 | EMail | Outbound | Sent |
| 04/10/2000 1 | 17782638 | EMail | Outbound | Sent |
| 04/06/2000 1 | 17682664 | EMail | Outbound | In Process |

Account Issues- 75 items

| Created On | Description |
|---|---|
| 04/06/2000 17:14:57 | Password Reset |
| 03/31/2000 10:51:45 | Balance, Position and Margin Inquiries |

[ Use ]
[ Notes ]

Issues for this Message-1 item

| Created On | Description | # of Notes | Status | Assigned |
|---|---|---|---|---|
| 04/03/2000 10 | Password Reset | 0 | Outbound Res | lschwab |

[ New ]
[ Delete ]

Status  [ Outbound: Resolved ▽ ]  Resp Channel [ EMail ▽ ]  [ Update Case ]
Target Group  [ 206 ▽ ]  Assigned To [ agent1 ]  [ Notes ]
Desc  [ Password Reset ]
Issue Id  [ 16545925 ]  Level 1 [ Account Service ▽ ]
Keywords  [ password resets reset ]  Cat. Id [ 119 ]  Level 2 [ Setup ▽ ]
Account  [ ▽ ]  Complaint [ ]  Level 3 [ 1st level password resets ▽ ]

Knowledge Based Article  [ ▽ ]  [ Add to Issue ]
Keywords  [ ]
Response Text
[ 246 ]

Fig 3

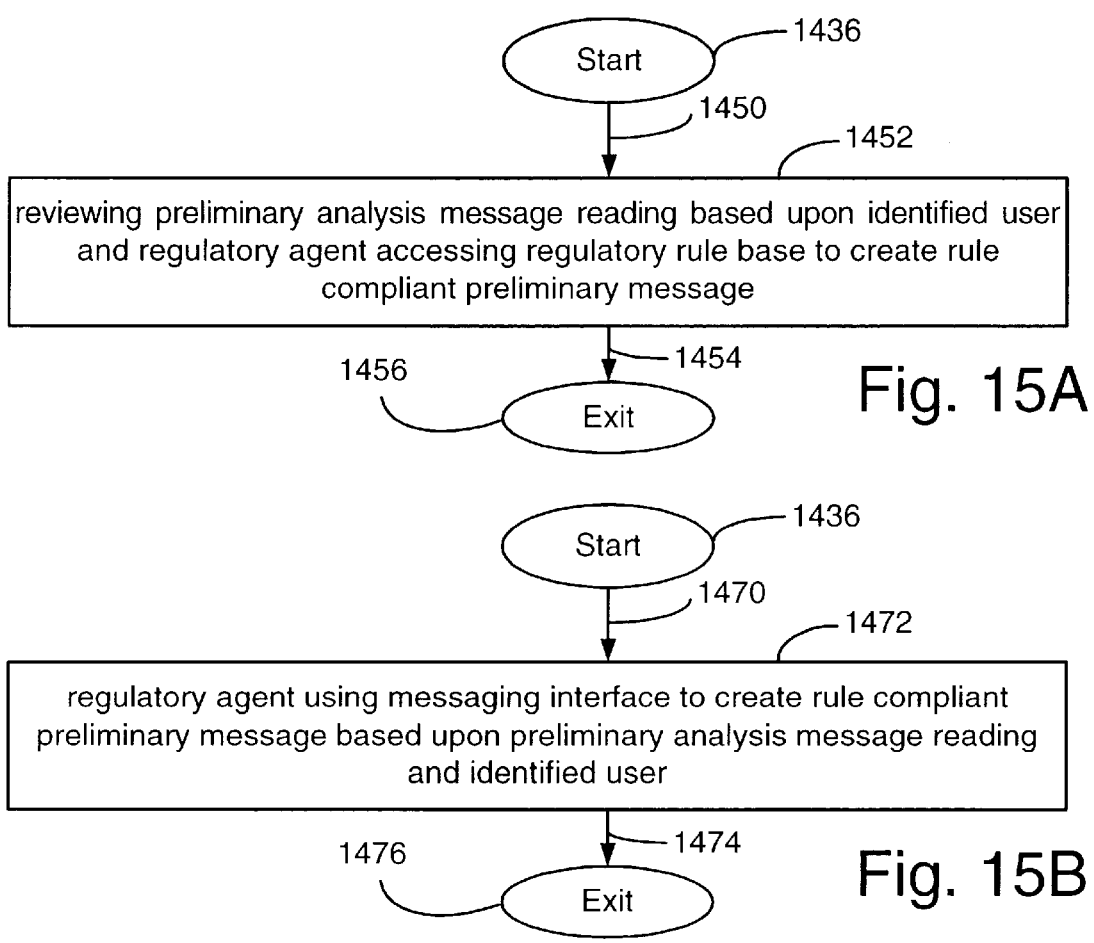

METHOD AND APPARATUS INSURING REGULATORY COMPLIANCE OF AN ENTERPRISE MESSAGING SYSTEM

TECHNICAL FIELD

This invention relates to electronic messaging, in particular to insuring regulatory compliance throughout an enterprise regarding messaging.

BACKGROUND ART

As the world of customer service evolves with the electronic age, email has become a very critical delivery channel for companies focused on providing customer service. Many regulatory systems are either in place, or publicly announced, which require regulatory reports regarding these communications on a thorough basis. Today, no method or mechanism exists for insuring such compliance has been systematically applied to all messaging within an enterprise. This lack of capability is a major source of risk for such enterprises.

Further, as corporate communications routinely cross not only state and provincial boundaries, but also national boundaries, determining which regulations apply is now an error prone, haphazard process. Determining who amongst the employees or agents of an enterprise is qualified to respond to a specific request is also error prone, with the obvious increased risk from mistakes as these regulatory requirements grow in complexity and importance. Further, there is no method or mechanism in place, which can integrate regulatory changes into a coherent, efficient communications system linking an enterprise to its employees, clients and vendors.

As the complexity and volume of messaging grows, so has the need for advanced email management systems and associated work-flow processes. Without such tools, managers responsible for customer contacts are forced to spend more time on managing the workflow and less time managing their employees or agents. What is further needed are messaging management systems and associated work-flow processes which free customer contact managers from managing the workflow so they can devote more time to managing their staffs.

Increasingly, new forms of communication such as "Chatrooms" and instant messaging, and voice-based email all represent new avenues in which regulations and corporate risk will inevitably grow. A number of these new communication media provide new opportunities for staff members to create an adverse impression of their enterprise, besides breaking formal regulations. What is needed includes mechanisms insuring compliance with both regulatory rules and corporate conduct rules.

SUMMARY OF THE INVENTION

Various embodiments solve all of these problems.

Certain embodiments include a method of creating a regulatory analysis message comprised of the following. Providing a messaging interface used by an agent containing at least one field accessing a message queue to create the regulatory analysis message. The message queue is based upon the agent. Identifying issues regarding the regulatory analysis message to create an issue collection containing at least one issue. Responding to each of the issues contained in the issue collection to create an issue response for each issue. And creating the regulatory analysis message based upon the issues responses for each of the issues of the issue collection.

Such embodiments advantageously support a messaging interface for the agent accessing the message queue based upon the agent. Identifying the issues advantageously supports developing the regulatory analysis message through exploration of those issues. Note that as used herein, regulations may refer not only to externally imposed regulations, such as financial trading regulations, but also may refer to internally imposed regulations such as enterprise policies. By way of example, such regulations may relate to press release reviews by various departments such as legal and marketing. Also by way of, example, such regulations may relate to technical paper presentations outside the enterprise, employee relations and employee complaints.

Certain further embodiments include identifying issues further comprised of viewing a possible issue collection containing a possible issue and selecting a first of the possible issues contained in the possible issue collection to create a first of the issues in the issue collection. Such embodiments advantageously support identifying issues by selection from a possible issue collection. This supports an enterprise utilizing an accumulation of wisdom regarding what the issues may be.

Certain further embodiments include each of the possible issues of the possible issue collection associated with a leaf of a possible issues tree. Selecting a possible issue is further comprised of selecting a branch-path to the leaf of the possible issues tree associated with the possible issue. Such embodiments advantageously support traversal of a hierarchical organization of the possible issues, which is often easier to use than a flat list.

Certain other further embodiments include identifying issues further comprised of selecting an issue and deleting the issue from the issue collection. Such embodiments advantageously support deleting an issue found to be inapplicable.

Certain other further embodiments include responding to each issue further comprising, for each of the issues, creating a note list responding to the issue. Such embodiments advantageously support creating a note list responding to an issue by agents. By way of example, a marketing agent may note specific customer preferences and a legal agent may note a precedent deemed relevant.

Certain further embodiments include creating the note list for the-issue further comprised of creating a note text and adding the note text to the note list responding to the issue to create a response note to the issue. Such embodiments advantageously support such note texts. As used herein, a note text may utilize standardized formats including text files, word processor files, Hyper Text Markup Language (HTML), Virtual Reality Markup Language (VRML) formats as well as including but not limited to .txt, .pdf, .pcl, .dvi and postscript file formats.

Certain further embodiments include creating the note text with a text editor. Such embodiments advantageously support creating the note text with a text editor. As used herein, a text editor may include but is not limited to text processors, word processors, layout generators and formatting tools generating note texts in standardized formats.

Certain other further embodiments include creating the note list for the issue further comprised of selecting a first response note to the issue in the note list for the issue and deleting the response note from the note list for the issue. Such embodiments advantageously support modifying the note list by removing a response note from the note list. This advantageously supports removal of inappropriate, incorrect, improperly worded and/or misleading responses.

Certain other further, embodiments include responding to each of the issues further comprised of selecting an article from a response knowledge base containing the article and using the article to create the response to the issue. Such embodiments advantageously support use of articles contained in a response knowledge base to respond to issues. This advantageously optimizes overall response time for the system and reduces the risks associated with the response by accessing the accumulated wisdom responding to the issues as embodied in the articles of the response knowledge base.

Certain further embodiments include using the article further comprised of adding the article to a response article list associated with the response to the issue. Such embodiments advantageously support using the knowledge base article by adding it to a response article list associated with the response. This is further advantageous in that since there is no modification of the article, the risk of non-compliant regulatory activity is lowered.

Certain other further embodiments include creating the regulatory analysis message further comprised of integrating the response of each issue to create the regulatory analysis message. Such embodiments advantageously support response integration of the issues raised in a message to create the regulatory analysis message. Such embodiments further advantageously insure compliance by insuring the response to each issue is integrated into the regulatory message.

Certain further embodiments include creating the regulatory analysis message based upon a received response request message from an identified individual. Such embodiments advantageously support insuring regulatory compliance of a response to the received response request message.

Certain further embodiments include the received response request message from the identified individual containing an initial issue collection of at least one initial issue. Identifying issues further comprised of reviewing the initial issue collection to create the issue collection. Such embodiments advantageously support the review of an initial issue collection creating the issue collection, from which responses will be made and integrated to create the regulatory analysis message.

Certain further embodiments include creating the regulatory analysis message further comprised of incorporating the received response request message from the identified user into the regulatory analysis message. Such embodiments advantageously support incorporating the received response request message into the regulatory analysis message, insuring the regulatory analysis message includes not only the user's request message, but also the integrated response of the issue collection involved. Such embodiments advantageously simplify the number of documents to be accessed in assessing regulatory compliance, minimizing administrative overhead. It also centralizes the communication for the identified user, placing both the request and response into a single integrated message.

Certain other further embodiments include creating the regulatory analysis message based upon a routed preliminary regulatory analysis message as a rule compliant preliminary message. Such embodiments advantageously support using the disclosed methods to review and possibly refine the routed preliminary regulatory analysis message to create the rule compliant preliminary message.

Certain further embodiments include identifying issues further comprised of reviewing the issue collection. Such embodiments advantageously support reviewing the issue collection as part of the identifying of issues. Such embodiments further insure compliance by the review of the issue collection.

Certain other further embodiments include responding to each of the issues further comprised of reviewing the response for each of the issues contained in the issue collection. Such embodiments advantageously support reviewing the response to each issue in responding to that issue. Such embodiments further insure compliance by the review of the response to each issue in the issue collection.

Certain other further embodiments include creating the regulatory analysis message further comprised of reviewing the regulatory analysis message based upon the responses for each of the issues of the issue collection. Such embodiments advantageously support reviewing the regulatory analysis message based upon the responses for each issue, further insuring regulatory compliance.

Certain embodiments include reviewing the regulatory analysis message further comprised of selecting a redo of the regulatory analysis message. Such embodiments advantageously support reviewing the regulatory analysis message causing the message to be redone. Such embodiments further insure regulatory compliance when the regulatory message is found deficient. Such deficiencies may include but are not limited to improper or inadequate identification of issues, improper or inadequate response to these issues and/or improper or inadequate integration of the issue responses.

Certain other further embodiments include the agent having an associated regulatory certification level. The queue based upon the agent is further based upon the associated regulatory certification level of the agent. Such embodiments advantageously support queuing messages based upon the associated regulatory certification level. Such embodiments advantageously insure that the messages accessed by the agent are appropriate for the agents' associated regulatory certification level.

Certain further embodiments include the agent having an associated department. The queue based upon the agent and the associated regulatory certification level is further based upon the associated department of the agent. Such embodiments advantageously support queuing messages based upon the associated regulatory certification level and associated department. Such embodiments advantageously insure that the messages accessed by the agent are appropriate for the agent's associated regulatory certification level and related to the agent's associated department. This significantly optimizes overall system performance as well as insuring regulatory compliance. Messages related to the agent's associated department-require significantly less research to answer, since the agent is more familiar with the associated department's business.

Certain embodiments include the agent having an associated department. The queue based upon the agent is further based upon the associated department of the agent. Such embodiments advantageously support queuing messages based upon the associated department. Such embodiments advantageously insure that the messages accessed by the agent are related to the agent's associated department. This significantly optimizes overall system performance. Messages related to the agent's associated department require significantly less research to answer, since the agent is more familiar with the associated department's business.

Certain embodiments include a method of insuring compliance of a regulatory rule set for messages generated by at least one agent of an enterprise comprising the following. Providing a messaging interface for the agent containing at least one field accessing a message queue based upon the agent to create the preliminary regulatory analysis message.

Sending the preliminary regulatory analysis message to a regulatory analysis engine to create a rule compliant preliminary message. And sending the rule compliant preliminary message to at least one identified user to create a rule compliant sent message to the identified user.

Such embodiments advantageously support creating the preliminary regulatory message by an agent using the messaging interface accessing the message queue based upon the agent, creating a rule compliant preliminary message by the regulatory analysis engine and sending the rule compliant preliminary message to the identified user(s). Such embodiments, by construction, insure that the regulatory analysis engine is part of the messaging process between the agent and the identified user.

Certain further embodiments include sending the rule compliant preliminary message further comprised of logging the rule compliant sent message to the identified user in a write-once archive. Such embodiments advantageously support archiving all rule compliant sent messages in an unalterable form. This turns all such archived rule compliant sent messages into essentially an affidavit-style record, which may later be treated that way by regulatory auditors and the judicial system.

Certain further embodiments include sending the preliminary regulatory analysis message further comprised of logging the rule compliant preliminary message in the write-once archive and logging the preliminary regulatory analysis message in the write-once archive. Such embodiments advantageously support archiving all rule compliant preliminary messages and preliminary regulatory analysis messages in an unalterable form. This turns all such archived messages into essentially an affidavit-style record, which may later be treated that way by regulatory auditors and the judicial system.

Certain other further embodiments include sending the preliminary regulatory analysis message further comprised of the following. Processing the preliminary regulatory analysis message and a regulatory agent list containing at least one regulatory agent to create a selected regulatory agent. Routing the preliminary regulatory analysis message to the selected regulatory agent to create a routed preliminary regulatory analysis message. And processing the routed preliminary regulatory analysis message by the selected regulatory agent to create the rule compliant preliminary message.

Such embodiments advantageously support selecting a regulatory agent, routing the preliminary regulatory message to the selected agent and processing the routed message by the selected agent. Such embodiments further insure by construction that a regulatory agent is selected, the message routed to them, and the processed results by the selected agent create the rule compliant message.

Certain embodiments include processing the routed preliminary regulatory analysis message further comprised of the following. Reading the routed preliminary regulatory analysis message to create a preliminary analysis message reading. And reviewing the preliminary analysis message reading based upon the identified user and based upon the regulatory agent to create the rule compliant preliminary message. Such embodiments advantageously support by construction reading and reviewing the routed preliminary message by the selected agent in creating the rule compliant preliminary message.

Certain embodiments include reviewing the preliminary analysis message reading further comprised of reviewing the preliminary analysis message reading based upon the identified user and based upon the regulatory agent accessing a regulatory rule base to create the rule compliant preliminary message. Such embodiments advantageously support by construction taking into account the identified user and the regulatory agent accessing the regulatory rule base in creating the rule compliant preliminary message.

Certain embodiments include the selected regulatory agent, as a software agent. Such embodiments advantageously support selecting software agents. Such embodiments are particularly important in interactive regulatory compliance communications venues including but not limited to chat-rooms and on-line press conferences, where the speed of response is essential.

Certain other further embodiments include reviewing the preliminary analysis message reading further comprised of the regulatory agent using a messaging interface to create the rule compliant preliminary message based upon the preliminary analysis message reading and based upon the identified user.

Such embodiments advantageously support the regulatory agent using the messaging interface to create the rule compliant preliminary message. Such embodiments further provide a consistent messaging interface for agents of an enterprise, lowering overall-systems overhead, training requirements as well as software maintenance and support expenses.

Certain other further embodiments include receiving a response request from the identified user to create a received response request from the identified user and routing the received response request from the identified user to the agent to create a routed response request from the identified user to the agent. Such embodiments advantageously support receiving and routing a response request from the identified user to create a routed response request. Such embodiments advantageously support not only telephone requests, email requests, but also interactive requests as found in chat rooms and other interactive venues. Such requests do not have to come from the identified user as a message, but may result from extracted content from a dialogue between the agent and identified user.

Certain further embodiments include providing the messaging interface to the agent further comprised of the following. Reading the routed response request from the identified user to create a read response request from the identified user. And generating the preliminary regulatory analysis message based upon the read response request from the identified user.

Such embodiments advantageously support reading the routed response request and generating the preliminary regulatory analysis message by the agent. Such embodiments by construction provide an agent directed systematic response generation mechanism tuned to comply with relevant regulations.

Certain other further embodiments include receiving the response request further comprised of logging the received response request from the identified user in the write-once archive. Such embodiments advantageously support logging the received response request in an unalterable form. This turns all such archived messages into essentially an affidavit-style record, which may later be treated. that way by regulatory auditors and the judicial system.

Certain other further embodiments include routing the received response request further comprised of the following. Analyzing the received response request from identified user to create a response request category. And examining an authorized agent collection of authorized agents based upon the response request category to select the agent.

Such embodiments advantageously support selecting the agent based upon the response request category analysis of the received response request. Such embodiments optimize the agent selection by an initial response request category analysis, improving the overall performance and reliability of the response process. Note that in certain further embodiments, growth in expertise regarding the response request categorization will increase the overall performance and reliability of the response process.

Certain further embodiments include examining the authorized agent collection further comprised of examining an authorized agent collection based upon the response request category and the received response request from the identified user to select the agent.

Such embodiments advantageously support selecting the agent based upon the response request category analysis and the received response request from the identified user. Such embodiments optimize the agent selection by an initial response request category analysis and the received response request from the identified user, improving the overall performance and reliability of the response process. Note that in certain further embodiments, growth in expertise regarding the response request categorization and examination of the received response request from the identified user will increase the overall performance and reliability of the response process.

Certain further embodiments include examining the authorized agent collection further comprised of the following. Determining an agent qualification based upon the response request category and based upon the received response request from the identified user. And examining the authorized agent collection based upon the response request category and the agent qualification and the identified user to select the agent.

Such embodiments advantageously support determining the agent qualification based upon the response request category and the received response request from the identified user. The agent selection is then based upon the response request category and the agent qualification and the identified user. Such embodiments optimize the agent selection by determining the requisite agent qualifications from the response request category and the received response request from the identified user. This improves the overall performance and reliability of the response process. Note that in certain further embodiments, growth in expertise regarding determination of agent qualification, as well as the response request categorization and examination of the received response request from the identified user, will increase the overall performance and reliability of the response process.

Certain embodiments include a process of making a regulatory analysis engine of an agent collection containing at least two agents of an enterprise for a regulation collection containing at least one regulation.

The regulatory analysis engine contains a certification collection, a possible issue collection and a routing process for a regulatory compliance message with an associated issue collection to a message portal list containing at least a sent-out portal.

The process comprises the following: extracting from the regulation collection to create the certification collection. Establishing from the regulation collection to create the possible issue collection. And deriving from the regulation collection and from the certification collection and from the possible issue collection to create the routing process.

Such embodiments advantageously support extracting the certification collection establishing the possible issue collection and creating the routing process for a regulatory engine to insure regulatory rule compliance.

Certain embodiments include the certification collection containing a first certification and a second certification. For a regulatory compliance message with associated issues collection of exactly the first certification, the routing process routes the first regulatory compliance message to agents having the first certification. For a regulatory compliance message with the associated issues collection containing exactly the second certification, the routing process routes the regulatory compliance message to agents having the second certification. Such embodiments advantageously support routing processes differentiating the message routing based upon the certification collection.

Certain embodiments include the regulatory analysis engine as a product of the above-discussed process. Such embodiments advantageously support regulatory analysis engines generated by the process as disclosed above.

Certain embodiments advantageously support operations discussed herein as program code segments included in a program operating system executed by a computing system including at least one computer with coupled computer readable memory operated by an agent. The program code segments are not required to all belong to the same instruction execution family, and they may advantageously include program code segments executing on multiple computers.

The computing system may advantageously further include a client computer collection and a server system coupled by a network. The network may advantageously couple with specific client computers continuously or sporadically. The server system includes at least one server computer with accessibly coupled computer memory. In certain further embodiments, the server system advantageously includes multiple server computers coupled to the network, each with coupled accessible computer memory.

These and other advantages of the present invention will become apparent upon reading the following detailed descriptions and studying the various figures of the drawings.

BRIEF DESCRIPTION OF THE DRAWINGS

FIG. 1 depicts a simplified version of a user interface as presented to an agent to create a preliminary regulatory analysis message in accordance with certain embodiments;

FIG. 2 depicts region 10 of FIG. 1 in detail, in accordance with certain embodiments;

FIG. 3 depicts region 12 of FIG. 1 in detail, in accordance with certain embodiments;

FIG. 15A depicts a detail flowchart of operation 1436 of FIG. 14B further performing reviewing preliminary analysis message reading in accordance with certain embodiments;

FIG. 15B depicts a detail flowchart of operation 1436 of FIG. 14B further performing reviewing the preliminary analysis message reading in accordance with certain embodiments;

DETAILED DESCRIPTION OF THE INVENTION

Figure 4:
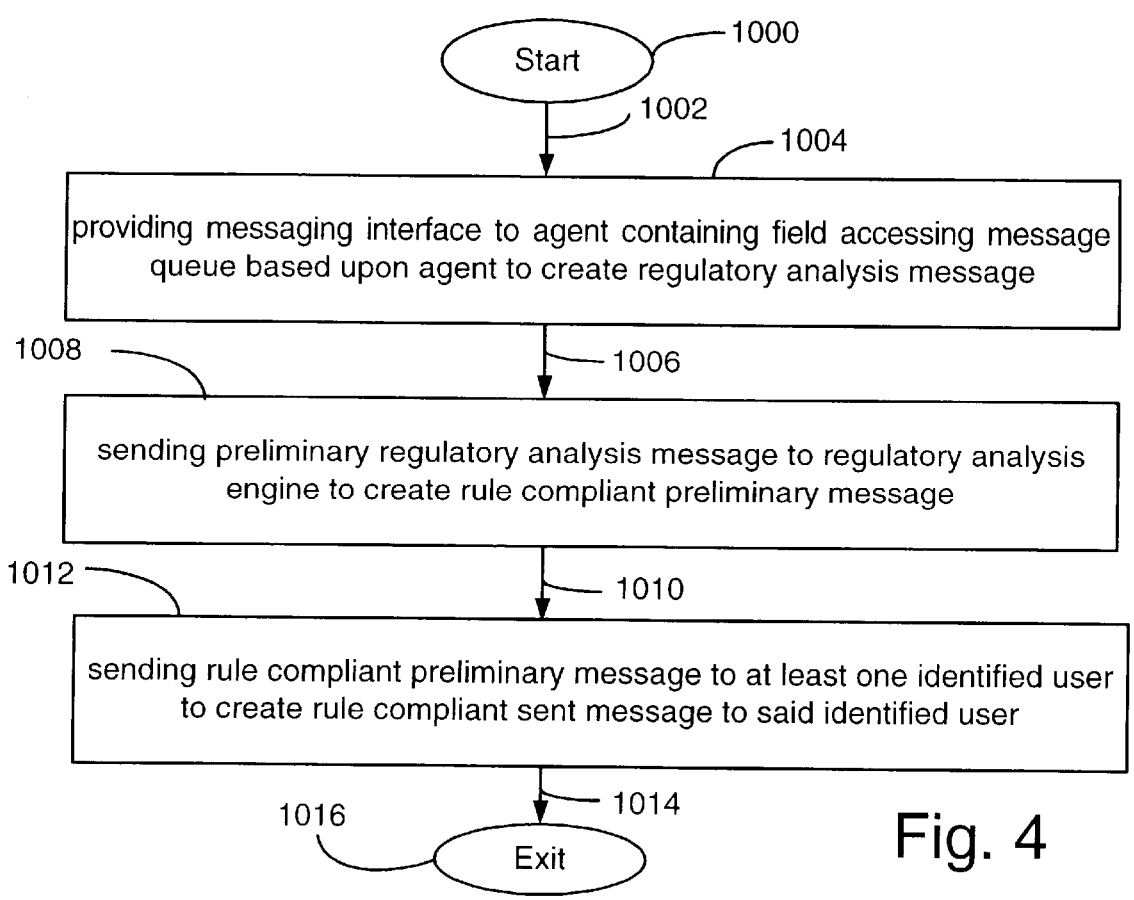
FIG. 4 depicts a method of operation employing a user interface as depicted in FIGS. 1, 2 and 3 insuring compliance of a regulatory rule set for messages generated by at least one agent of an enterprise.

Certain embodiments include a messaging management system and associated work-flow processes allow the customer contact managers to focus more time on managing employees and less time managing the workflow. The process also includes several safe guards, which insure that the company remains compliant with the regulators and also provides a system for quality control measurement.

Certain further embodiments include an email workflow process for enterprise customer email comprising a process, which is both efficient and compliant with regulatory reporting requirements. These regulatory requirements include messaging regulatory requirement set forth by the Securities Exchange Commission (SEC) and the National Association of Securities Dealers (NASD).

FIG. 1 depicts a simplified version of a user interface as presented to an agent to create a preliminary regulatory analysis message in accordance with certain embodiments.

The top region 2 presents a message identification. Folder tab 4 is entitled "Email Message" and presents the usage of certain embodiments. Folder tab 6 entitled "Attachment" and Folder tab 8 entitled "Action History/Audit Trail" are included in this Figure for completeness but will not be discussed further. Due to the complexity of the displayed content the presentation of the user interface is summarized in this Figure by regions 10 and 12, which will be discussed in FIGS. 2 and 3. The region at the bottom with the text "Click <Send> to send Message; <Edit> to re-edit" is applicable to the content of the entire user interface.

FIG. 2 depicts region 10 of FIG. 1 in detail, in accordance with certain embodiments.

The account number 20 is a field presenting the account of the individual intended to receive the message being created. In certain embodiments, an individual is an employee, vendor and customer. In certain other further embodiments, the account may refer to a collection of individuals, such as a company or family with more than one identified user who may receive messages. In certain further embodiments the account field may present an identification of another corporate entity or government agency or representative.

The Tax Id field 22 presents a standardized identification of the account, usually in compliance with the national tax system. Note that in certain further embodiments, the relevant national tax system is identified.

Segment field 24 portrays the group of accounts by behavior or activity to which the current account belongs. By way of example, couples with a once a year history of depositing into their IRA might well form one segment, another segment could contain accounts doing over $100,000 per months in trading, a government agency such as the U.S. Department of Commerce, Internal Revenue Service or a regulatory agency such as the SEC.

Registration 26 field specifies what kind of registered account is involved, in certain embodiments. In certain further embodiments, this is a designation includes but not limited to one or more members of the collection "Single Individual", "Joint Account", "Individual Retirement Account(IRA)", or "Corporate".

Individual Name 28 field portrays the name of the individual to whom the message will be sent. Note that in certain embodiments, this may be an individual associated with a customer account. In certain other embodiments, this may be an individual associated with a vendor account. The "Tax Id" 30 field portrays the tax identifier of the individual associated with account 20, which may distinct in cases where the account 20 has more than one individual associated with the account. Alternatively, an individual 28 may have a personal tax identifier 30, as well as own a business having account 20 with a separate tax identifier 22.

The details region includes but is not limited to the following. Direction 32 field portrays whether the message is inbound or outbound. The "Assigned To" 34 field portrays which agent of the enterprise is assigned to create this preliminary regulatory analysis message. The "Suped By" field 36 portrays the regulatory agent who has reviewed the completed preliminary regulatory analysis message before it is sent to the individual.

Status 38 portrays the status of the preliminary regulatory analysis message as "New", "Sent", "In Process", "Queued-Supe", "Process-Resp Regd", "Processed-No Resp Rreqd", "Processed-Auto Replied", "ReDo" and "Supe-In Process".

Contact Age 40 portrays when a response request message was received by certain embodiments.

Reply For 42 field portrays the contact or message identifier for the response request message to which this message is in response.

Product 44 field portrays which corporate product or information gateway was responsible for the response request message, in certain embodiments. In certain further embodiments, the Product 44 indicates the corporate product identified by an authentication process.

The "Created in Error" 46 flag may be set by the agent to indicate that the message should not be sent. This flag is particularly useful in systems supporting the write-once archiving of all preliminary regulatory analysis messages. In such systems, such messages are not deleted, but are flagged by using this mechanism, so that they cease to move through the messaging system.

The Compose 100 button is pressed by the agent when all open issues or cases regarding the preliminary regulatory analysis message have been resolved. This will be discussed in greater detail shortly. The Edit 102 button, when selected causes the message to be re-edited. The Spell Check 104 button invokes a spelling checking program to review the editor version of preliminary regulatory analysis message.

The "New Rev" button 106 is selected when a Redo has been requested for a preliminary regulatory analysis message upon review. This has the effect of both first saving the current version of the message and creating a new revision of the message.

The Send 108 button invokes an outbound workflow, which will be described in greater detail shortly.

The "To Address" field 110 portrays which individual will receive the preliminary regulatory analysis message.

The "Return Addr" 112 portrays the internal group designation address for replies to the sent version of the preliminary regulatory analysis message, once it has been reviewed and sent to the identified individual 28.

Subject field 114 is in certain embodiments the standard subject line of an Email message. In certain embodiments, such as telephone responses it may be the subject reference left on an answering machine if the customer cannot be reached.

The "#Attachments" 116 field indicates the number of attached file contents received from the individual with the response request message.

Email Body 120 is a region portraying the message contents.

FIG. 3 depicts region 12 of FIG. 1 in detail, in accordance with certain embodiments.

Region 12 contains an account messages region 140, an account issues region 160, issues for this message region 180 as well as a number of additional fields to be discussed.

In certain embodiments, account messages region 140 portrays a message or contact queue from which the agent operating the user interface may select a contact or message for the selected account 20.

In certain embodiments, the messages are comprised of response request messages. In certain further embodiments, the identified users sending these response request messages are customers. In certain other further embodiments, the identified users sending these response request messages are employees. In certain other further embodiments, the identified users sending these response request messages are vendors. In certain other further embodiments, the identified users sending these response request messages are government agencies. In certain other further embodiments, the identified users, sending these response request messages are other corporate entities, who in some cases may become customers or vendors, or be involved through other contractual relationships, such as licensing and shared membership in a standards committee.

In certain further embodiments, the message queue may be accessible by more than one agent. In certain further embodiments, the message queue may be concurrently accessible by more than one agent.

The account message region 140 contains a collection of headers, presenting the content of the corresponding fields of each line in the viewable table.

The "Created On" field 142 portrays the date and time stamp when the response request message was received by the system when the message is inbound 32. When the message is outbound 32, the "Created On" field 142 portrays the date and time stamp when the response message was created within the system.

The "Message ID" field 144 portrays the system identifier associated with the specific response request message. Note that message ID of the currently open message is displayed in region 2 in FIGS. 1 and 2.

The Channel field 146 portrays the information channel through which the message entered the system. In certain further embodiments, the information channel is selected from a collection of at least messaging and telephone calls. In certain further embodiments, messaging includes but is not limited to Email. In certain further embodiments, messaging includes but is not limited to voice mail. The delivery of voice mail may be across a messaging communications system employing a communications protocol compatible with TCP/IP. In certain further embodiments, that communication protocol is compatible with the World Wide Web. Note that certain further embodiments, the communication protocol may be compatible with the Wireless Application Protocol (WAP).

The direction field 148 contains entries selected from a collection comprising "Inbound" or "Outbound". Once a message has been selected from the queue, the value in this filed is inserted into the Direction field 32.

The Status field 150 may be a member of a collection including but not limited to "New", "Pending", "Sent", "In Process", which reflects, the Status field 38 discussed above. Note that in certain further embodiments, multiple agents may be concurrently processing message regarding the same account. This field helps reveal that to those involved.

Account issue region 160 contains all the various cases or issues involved with the current account messages. The column headings for Account issue region 160 include "Created On" 162 and Description 164. Account issue region 160 also has two associated buttons labeled "Use" 166 and "Notes" 168.

The "Issues for this Message" region 180 includes column headings "Created On" 182, Description 184, "#of Notes" 186, Status 188 and Assigned 190.

"Issues for this Message" region 180 also includes buttons labeled New 192 and Delete 194. Each line entry in this region is an issue regarding the current preliminary regulatory analysis message with column entries under each column heading. Selecting New 192 opens a dialogue adding a new issue regarding the preliminary regulatory analysis message. Selecting Delete 194 removes a issue regarding the preliminary regulatory analysis message.

Below these regions are a number of fields which will now be described. These fields concern the selected preliminary regulatory analysis message being prepared. Status field 200 designates the current status of the selected issue of the preliminary regulatory analysis message being prepared. Status field 200 may include "Pending:Assigned_Rep", "Pending:Dept1", "Pending:Dept2", etc. "New", "Closed", "In Process", "Opened in Error" and "Resolved" entries.

"Resp. Channel" field 202 may include entries Email or Phone.

The "Update Issue" 204 button, when selected update the selected issue for the selected preliminary regulatory analysis message.

"Target Group" field 206 identifies the department to which the issue is forwarded. In certain further embodiments, a department may possess a message queue. In certain further embodiments, an agent associated with that department may select the issue to prepare an issue response message.

"Assigned To" field 208 includes the identifier of an agent assigned to use this interface to generate the preliminary regulatory analysis message.

The Notes 210 button, when selected provides for the entry of text to be incorporated as a note associated with the selected issue of the preliminary regulatory analysis message. Upon successful completion of note entry, the "# of Notes" 186 field of the corresponding line entry will be incremented.

The "Desc" field 212 displays the "Description" entry 184 of the selected issue regarding the current preliminary regulatory analysis message. The "Issue Id" field 214 indicates the issue identifier, which is unique to each issue of each message. The Level1 216, Level2 218 and Level3 220 fields provide pull down menus providing a 3 level tree traversal of all issue categories, which have been organized to permit easy outline-style conceptual traversal of all issue categories to aid in efficiently selecting a issue category. Alternatively, the keywords 224 associated with a issue category may be selected and entered into this field, which will yield the category as well. The "Cat Id" field 226 portrays the category identifier for the selected issue. The category identifier 226 may be determined by selection of Level1 216, Level2 218 and Level3 220 pull down menu items. Alternatively, the category identifier 226 may be determined by selection of keywords 224.

Account field 230 portrays the specific account to which the preliminary regulatory analysis message refers.

Complaint flag 232 portrays whether this preliminary regulatory analysis message is in response to a complaint message.

"Knowledge Based Article" field 240 is a pull down menu of articles in the knowledge base regarding the selected issue category which have been previously approved for messages. Keywords field 242 allows the agent to search the knowledge base for articles associated with the entered keywords.

Selecting the "Add to Issue" button 244 adds the response text 246 to text for the message regarding the selected issue.

Response Text 246 presents the text of the knowledge based article 240 for examination by the agent, who may then select "Add to Issue" button 244 adding this text to message regarding the selected issue.

Once the agent has confirmed the response for the issues regarding the selected message and possibly added notes for one or more issues of the selected message, the agent selects the Compose button 100 of FIG. 2 to integrate the selected knowledge based articles into a response to a response request message. Additionally, in certain further embodiments, the individual's name and the agent's name and the agent's department name are also inserted to the response. This invokes a text editor or word processor in certain further embodiments.

Once this editing is completed, the agent may return to the user interface as shown in FIGS. 1, 2 and 3, if further work must be done, such as adding more issues and searching the knowledge based for additional notes.

At various points, the agent may perform spell checking on the text by selecting "Spell Check" button 104 as shown in FIG 2. At various points, the agent may edit the text by-selecting "Edit" button 102 as shown in FIG. 2.

If regulatory review requires a revision, the agent may create a new revision of the text by selecting "New Rev" button 106 as shown in FIG. 2.

Once satisfied with the message, the agent selects "Send" button 108, creating the preliminary regulatory analysis message, which is then sent to a regulatory analysis engine to create a rule compliant preliminary message.

FIG. 4 depicts a method of operation employing a user interface as depicted in FIGS. 1, 2 and 3 insuring compliance of a regulatory rule set for messages generated by at least one agent of an enterprise.

Operation 1000 starts the operations of this flowchart. Arrow 1002 directs the flow of execution from operation 1000 to operation 1004. Operation 1004 performs providing a messaging interface by an agent containing at least one field accessing a message queue based upon the agent to create the regulatory analysis message. Arrow 1006 directs execution from operation 1004 to operation 1008. Operation 1008 performs sending said preliminary regulatory analysis message to a regulatory analysis engine to create a rule compliant preliminary message. Arrow 1010 directs execution from operation 1008 to operation 1012. Operation 1012 performs sending said rule compliant preliminary message to at least one identified user to create a rule compliant sent message to said identified user. Arrow 1014 directs execution from operation 1012 to operation 1016. Operation 1016 terminates the operations of this flowchart.

Figures 5A, 5B:
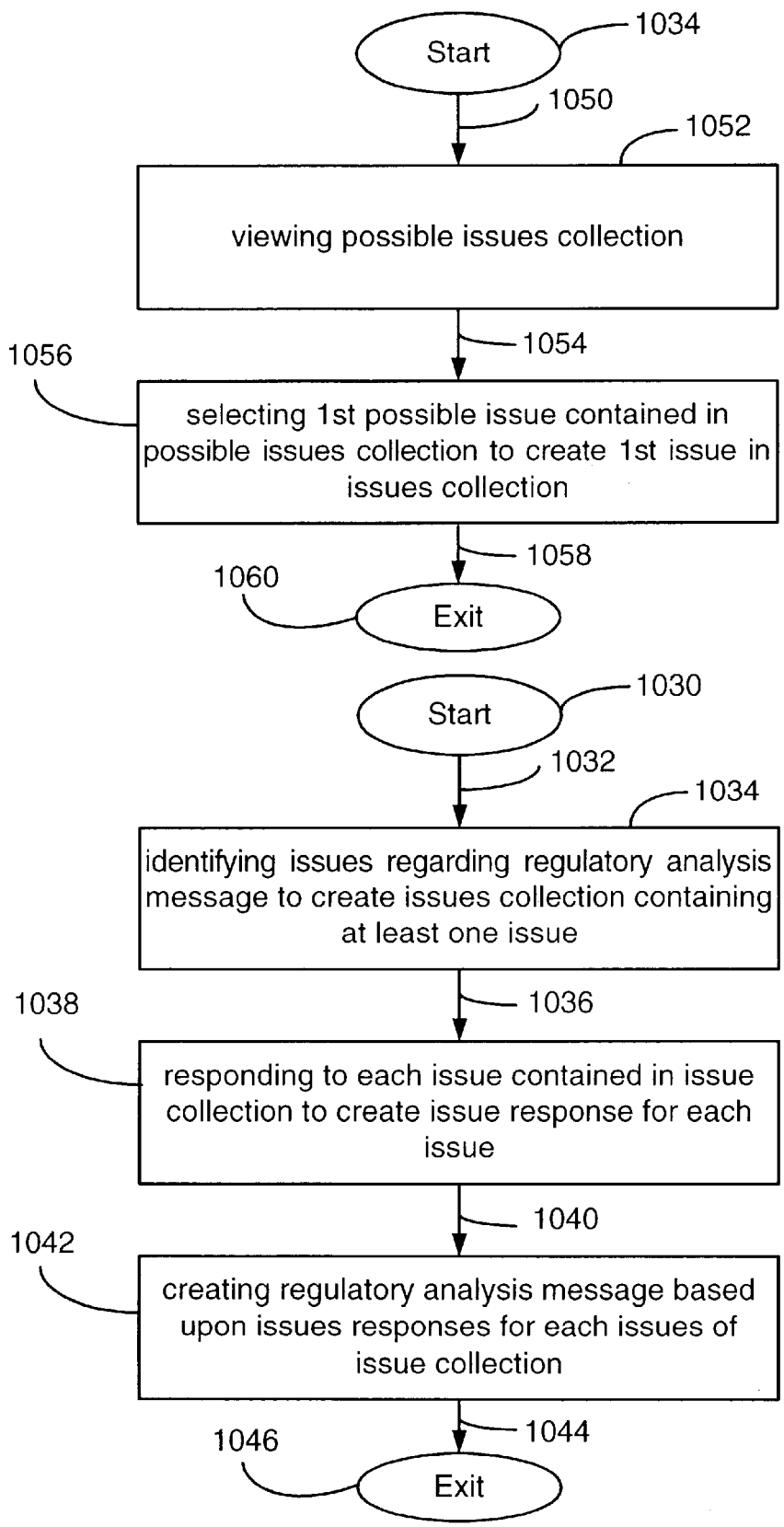
FIG. 5A depicts a flowchart performing method of using a messaging interface by an agent containing at least one field to create a regulatory analysis message in accordance with certain embodiments.
FIG. 5B depicts a detail flowchart of user operation 1034 of FIG. 5A further performing identifying issues regarding the regulatory analysis message to create an issue collection containing at least one issue, in accordance with certain embodiments.

FIG. 5A depicts a flowchart performing method of using a provided messaging interface by an agent containing at least one field to create a regulatory analysis message in accordance with certain embodiments.

Note that in various embodiments, this method of use can be employed to create at least any of the regulatory analysis messages discussed herein, either directly by the agent or in response to a response request message. The response request messages may originate internally to the enterprise, or externally. Externally originated response requests may be from customers, customer agents, regulatory bodies, representatives or agents of regulatory bodies, vendors, agents of vendors, other companies, employees, employee organizations, agents of employees and the like. Note that employee organizations may include but are not limited to clubs, interest groups, unions and trade associations.

User operation 1030 starts the usage of this flowchart. Arrow 1032 directs the usage flow from user operation 1030 to user operation 1034. User operation 1034 performs identifying issues regarding the regulatory analysis message to create an issue collection containing at least one issue. Arrow 1036 directs usage from user operation 1034 to user operation 1038. User operation 1038 performs responding to each of the issues contained in the issue collection to create an issue response for each issue. Arrow 1040 directs usage from user operation 1038 to user operation 1042. User operation 1042 performs creating the regulatory analysis message based upon the issues responses for each of the issues of the issue collection. Arrow 1044 directs usage from user operation 1042 to user operation 1046. User operation 1046 terminates the usage of this flowchart.

FIG. 5B depicts a detail flowchart of user operation 1034 of FIG. 5A further performing identifying issues regarding the regulatory analysis message to create an issue collection containing at least one issue, in accordance with certain embodiments.

Arrow 1050 directs the usage flow from starting user operation 1034 to user operation 1052. User operation 1052 performs viewing a possible issue collection containing a possible issue. Arrow 1054 directs usage from user operation 1052 to user operation 1056. User operation 1056 performs selecting a first of the possible issues contained in the possible issue collection to create a first of the issues in the issue collection. Arrow 1058 directs usage from user operation 1056 to user operation 1060. User operation 1060 terminates the usage of this flowchart.

Certain further embodiments include each of the possible issues of the possible issue collection associated with a leaf of a possible issues tree.

Figure 6A:
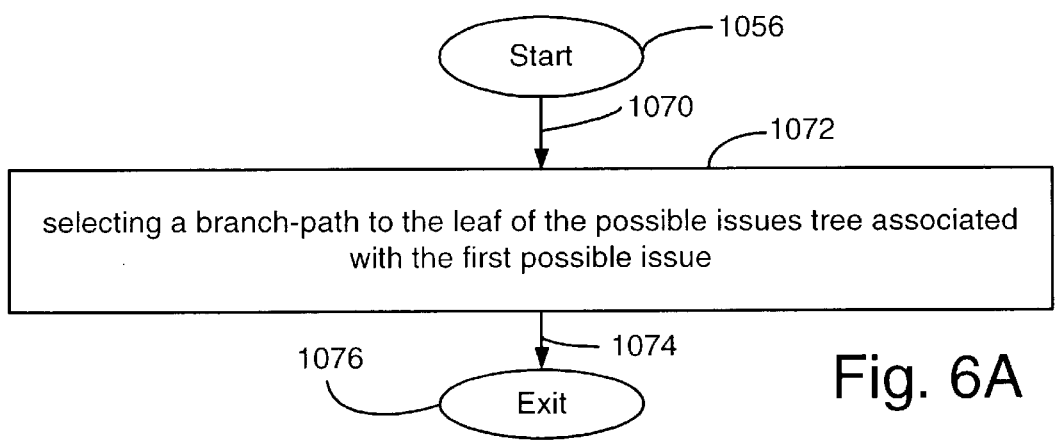
FIG. 6A depicts a detail flowchart of user operation 1056 of FIG. 5B performing selecting a branch-path to the leaf of the possible issues tree associated with the first possible issue in accordance with certain embodiments.

FIG. 6A depicts a detail flowchart of user operation 1056 of FIG. 5B performing selecting a branch-path to the leaf of the possible issues tree associated with the first possible issue in accordance with certain embodiments.

Arrow 1070 directs the usage flow from starting user operation 1056 to user operation 1072. User operation 1072 performs selecting a branch-path to the leaf of the possible issues tree associated with the first possible issue. Arrow 1074 directs usage from user operation 1072 to user operation 1076. User operation 1076 terminates the usage of this flowchart.

Figure 6B:
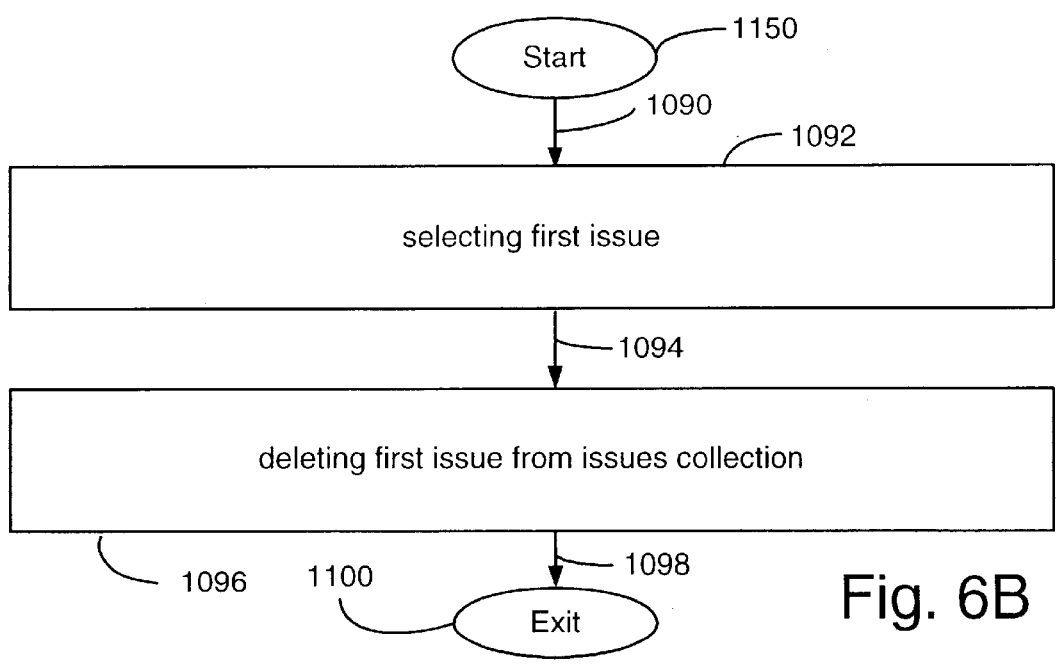
FIG. 6B depicts a detail flowchart of user operation 1056 of FIG. 6A further performing identifying issues regarding the regulatory analysis message in accordance with certain embodiments.

FIG. 6B depicts a detail flowchart of user operation 1056 of FIG. 6A further performing identifying issues regarding the regulatory analysis message in accordance with certain embodiments.

Arrow 1090 directs the usage flow from starting user operation 1056 to user operation 1092. User operation 1092 performs selecting a first of the issues of the issue collection. Arrow 1094 directs usage from user operation 1092 to user operation 1096. User operation 1096 performs deleting the first issue from the issue collection. Arrow 1098 directs usage from user operation 1096 to user operation 1100. User operation 1100 terminates the usage of this flowchart.

Figure 7A:
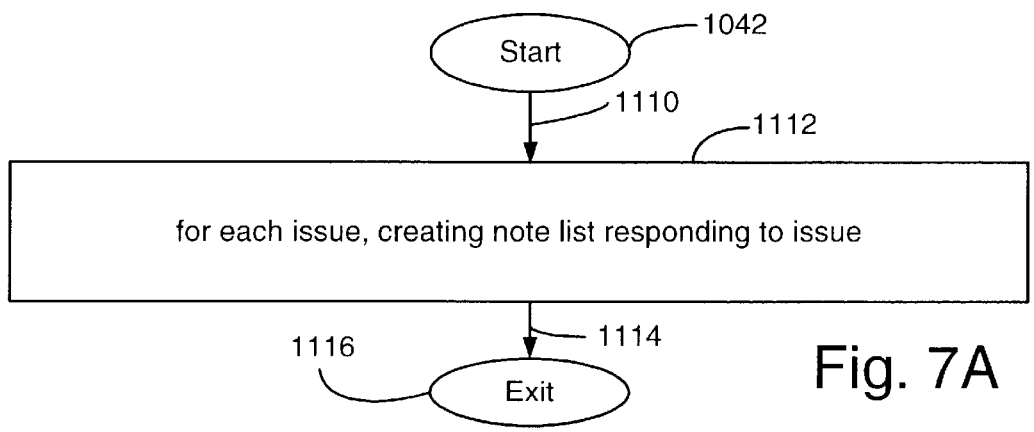
FIG. 7A depicts a detail flowchart of user operation 1042 of FIG. 5A further performing responding to each of the issues in accordance with certain embodiments.

FIG. 7A depicts a detail flowchart of user operation 1042 of FIG. 5A further performing responding to each of the issues in accordance with certain embodiments.

Arrow 1110 directs the usage flow from starting user operation 1042 to user operation 1112. User operation 1112 performs for each of the issues of the issue collection, creating a note list responding to the issue. Arrow 1114 directs usage from user operation 1112 to user operation 1116. User operation 1116 terminates the usage of this flowchart.

Figure 7B:
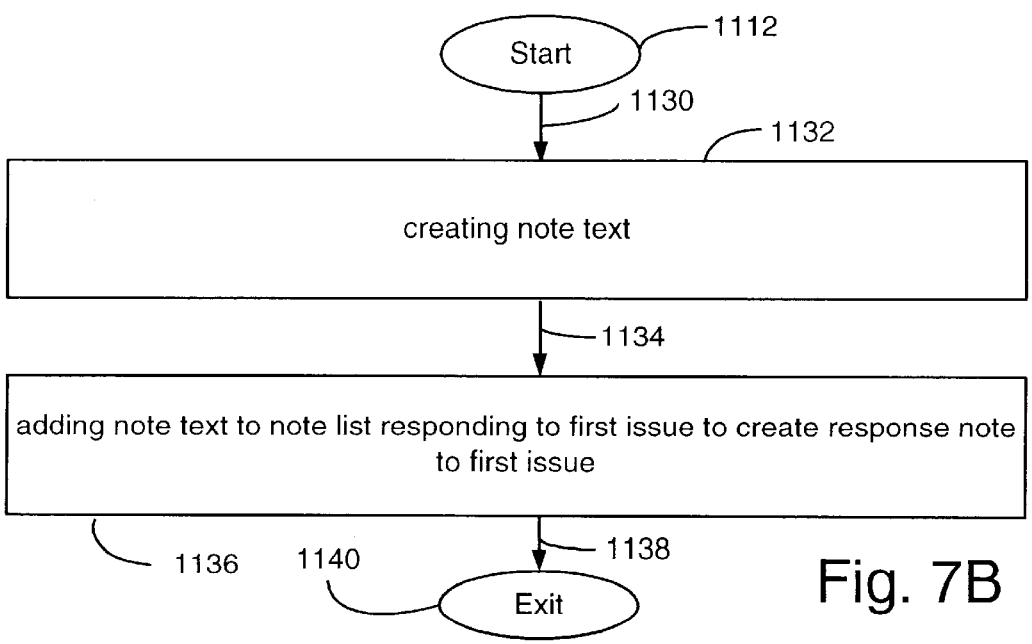
FIG. 7B depicts a detail flowchart of user operation 1112 of FIG. 7A further performing for a first issue of the issue collection, creating the note list for the first issue in accordance with certain embodiments.

FIG. 7B depicts a detail flowchart of user operation 1112 of FIG. 7A further performing for a first issue of the issue collection, creating the note list for the first issue in accordance with certain embodiments.

Arrow 1130 directs the usage flow from starting user operation 1112 to user operation 1132. User operation 1132 performs creating a note text. Arrow 1134 directs usage from user operation 1132 to user operation 1136. User operation 1136 performs adding the note text to the note list responding to the first issue to create a response note to the first issue. Arrow 1138 directs usage from user operation 1136 to user operation 1140. User operation 1140 terminates the usage of this flowchart.

Figure 8A:
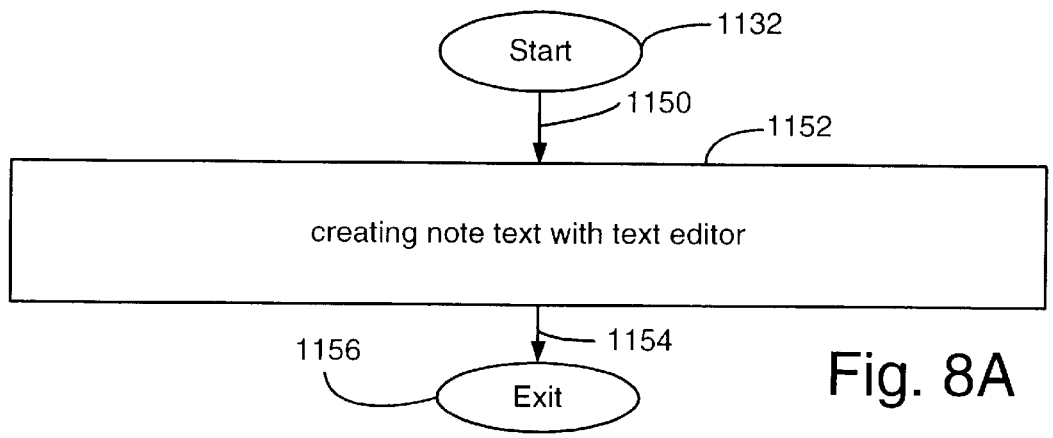
FIG. 8A depicts a detail flowchart of user operation 1132 of FIG. 7B further performing creating the note text in accordance with certain embodiments.

FIG. 8A depicts a detail flowchart of user operation 1132 of FIG. 7B further performing creating the note text in accordance with certain embodiments.

Arrow 1150 directs the usage flow from starting user operation 1132 to user operation 1152. User operation 1152 performs creating the note text with a text editor. Arrow 1154 directs usage from user operation 1152 to user operation 1156. User operation 1156 terminates the usage of this flowchart.

Figure 8B:
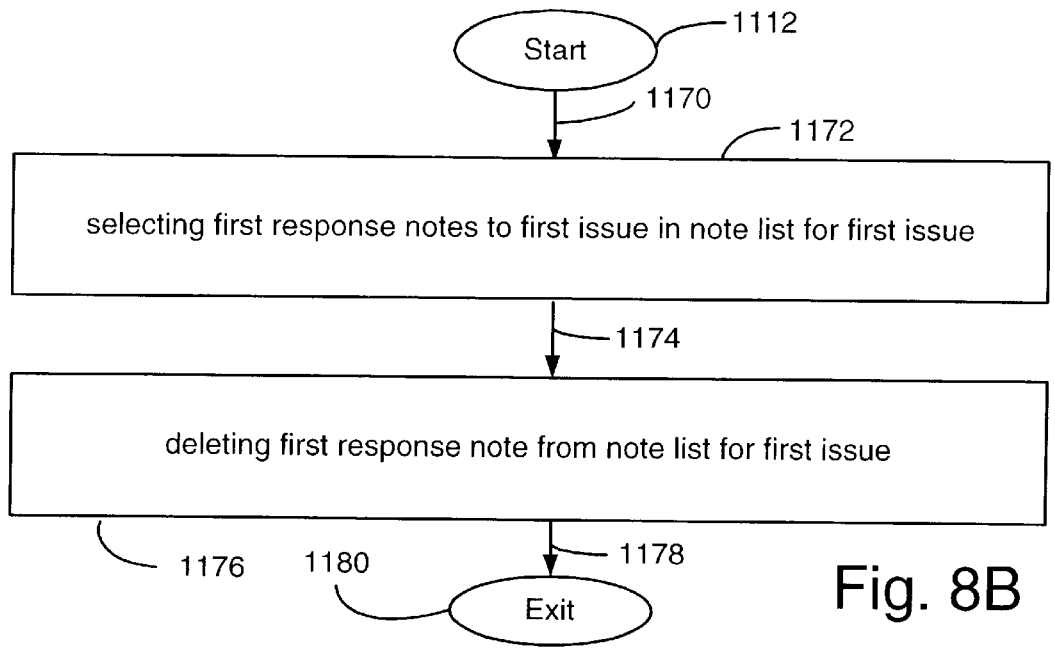
FIG. 8B depicts a detail flowchart of user operation 1112 of FIG. 7A further performing creating the note list for the first issue in accordance with certain embodiments.

FIG. 8B depicts a detail flowchart of user operation 1112 of FIG. 7A further performing creating the note list for the first issue in accordance with certain embodiments.

Arrow 1170 directs the usage flow from starting user operation 1112 to user operation 1172. User operation 1172 performs selecting a first of the response notes to the first issue in the note list for the first issue. Arrow 1174 directs usage from user operation 1172 to user operation 1176. User operation 1176 performs deleting the first response note from the note list for the first issue. Arrow 1178 directs usage from user operation 1176 to user operation 1180. User operation 1180 terminates the usage of this flowchart.

Figure 9B:
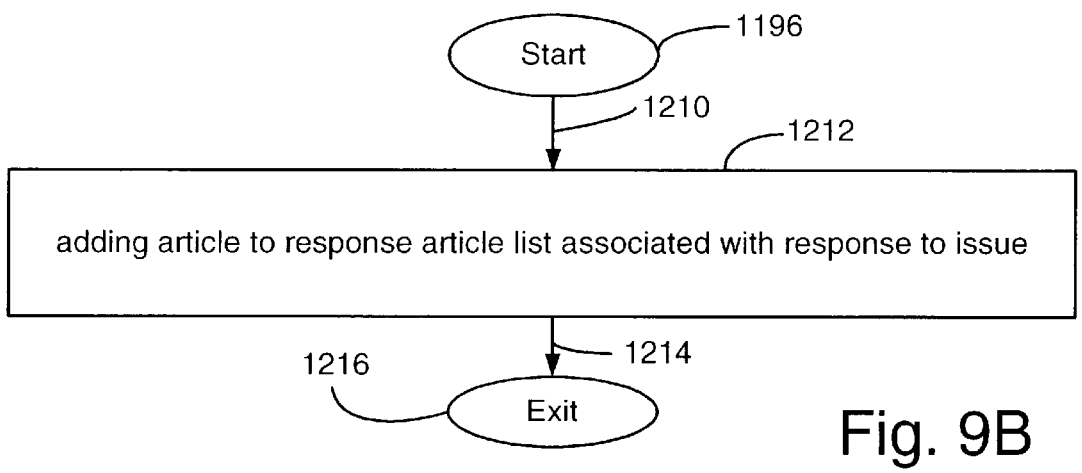
FIG. 9B depicts a detail flowchart of user operation 1196 of FIG. 9A further performing using the article in accordance with certain embodiments.
Figure 9A:
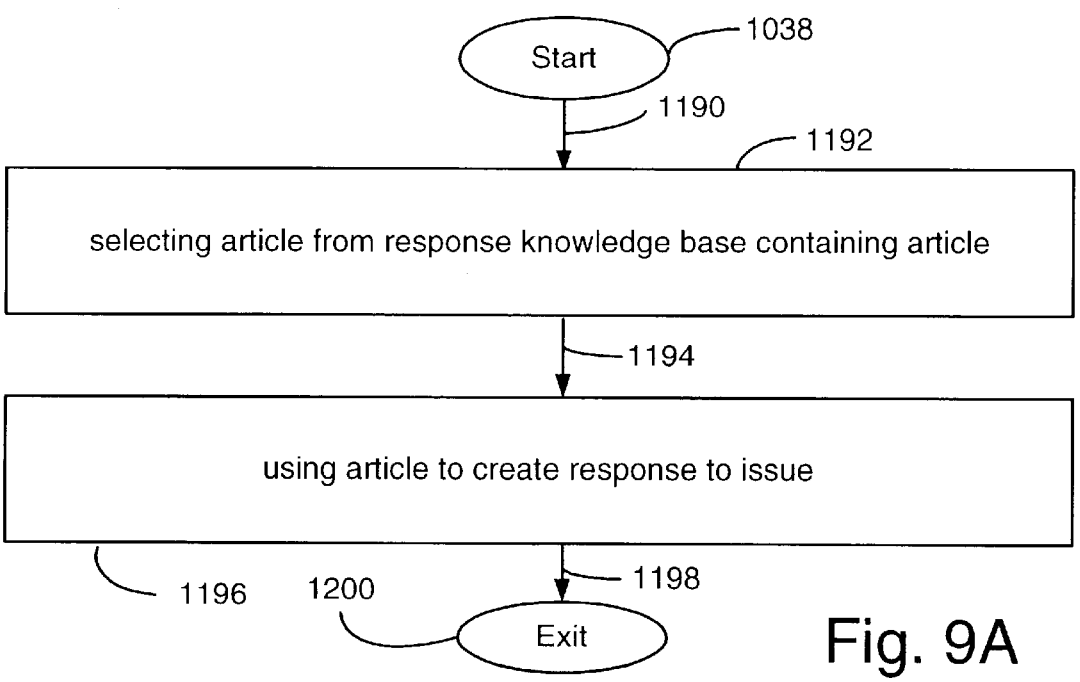
FIG. 9A depicts a detail flowchart of user operation 1038 of FIG. 5A further performing responding to each of the issues in accordance with certain embodiments.

FIG. 9A depicts a detail flowchart of user operation 1038 of FIG. 5A further performing responding to each of the issues in accordance with certain embodiments.

Arrow 1190 directs the usage flow from starting user operation 1038 to user operation 1192. User operation 1192 performs selecting an article from a response knowledge base containing the article. Arrow 1194 directs usage from user operation 1192 to user operation 1196. User operation 1196 performs using the article to create the response to the issue. Arrow 1198 directs usage from user operation 1196 to user operation 1200. User operation 1200 terminates the usage of this flowchart.

FIG. 9B depicts a detail flowchart of user operation 1196 of FIG. 9A further performing using the article in accordance with certain embodiments.

Arrow 1210 directs the usage flow from starting user operation 1196 to user operation 1212. User operation 1212 performs adding the article to a response article list associated with the response to the issue. Arrow 1214 directs usage from user operation 1212 to user operation 1216. User operation 1216 terminates the usage of this flowchart.

Figure 10A:
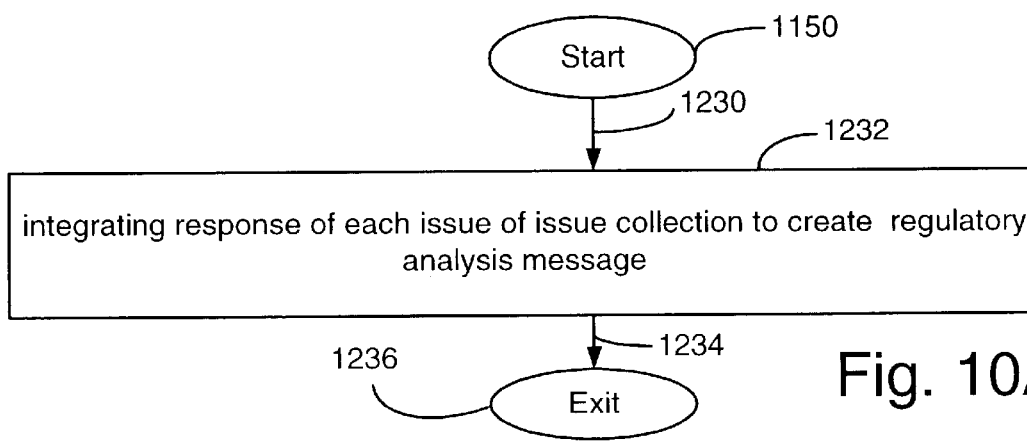
FIG. 10A depicts a detail flowchart of user operation 1042 of FIG. 5A further performing creating the regulatory analysis message in accordance with certain embodiments.

FIG. 10A depicts a detail flowchart of user operation 1042 of FIG. 5A further performing creating the regulatory analysis message in accordance with certain embodiments.

Arrow 1230 directs the usage flow from starting user operation 1042 to user operation 1232. User operation 1232 performs integrating the response of each of the issues of the issue collection to create the regulatory analysis message. Arrow 1234 directs usage from user operation 1232 to user operation 1236. User operation 1236 terminates the usage of this flowchart.

Certain further embodiments include creating the regulatory analysis message based upon a received response request message from an identified individual. Certain further embodiments include the received response request message from the identified individual containing an initial issue collection containing at least one initial issue.

Figure 10B:
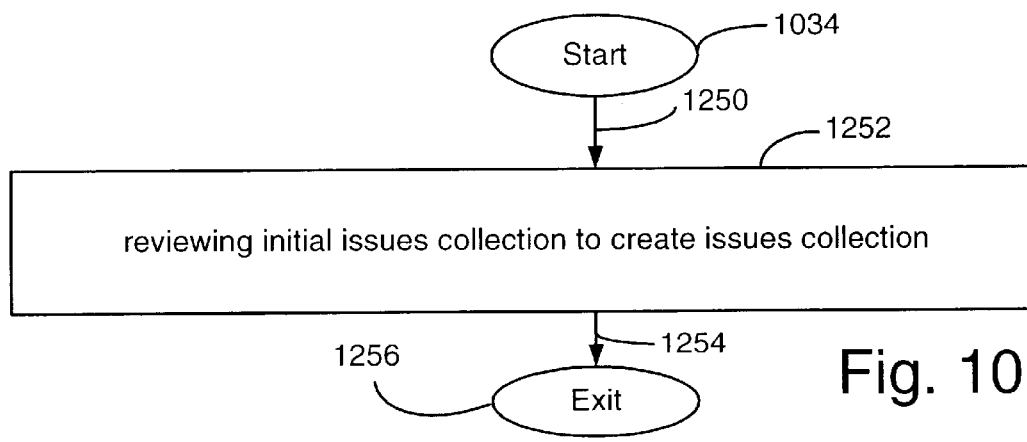
FIG. 10B depicts a detail flowchart of user operation 1034 of FIG. 5A further performing identifying the issues in accordance with certain embodiments.

FIG. 10B depicts a detail flowchart of user operation 1034 of FIG. 5A further performing identifying the issues in accordance with certain embodiments.

Arrow 1250 directs the usage flow from starting user operation 1034 to user operation 1252. User operation 1252 performs reviewing the initial issue collection to create the issue collection. Arrow 1254 directs usage from user operation 1252 to user operation 1256. User operation 1256 terminates the usage of this flowchart.

Figure 10C:
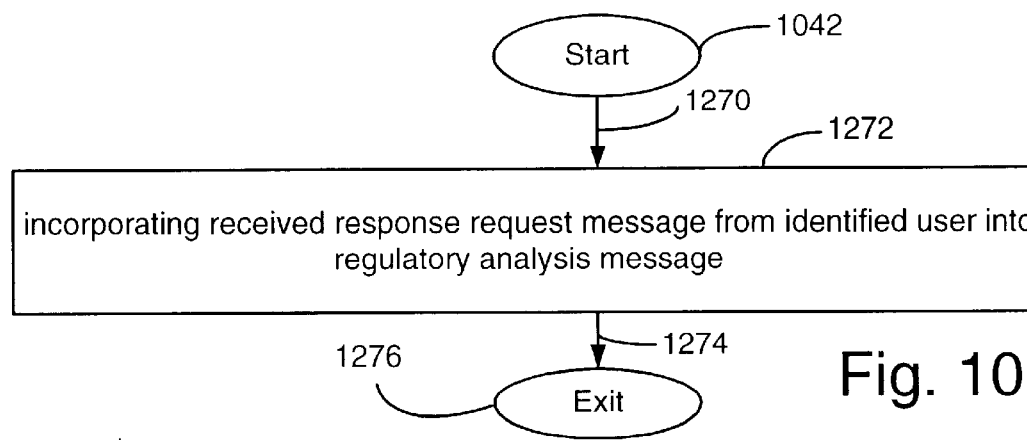
FIG. 10C depicts a detail flowchart of user operation 1042 of FIG. 5A further performing creating the regulatory analysis message in accordance with certain embodiments.

FIG. 10C depicts a detail flowchart of user operation 1042 of FIG. 5A further performing creating the regulatory analysis message in accordance with certain embodiments.

Arrow 1270 directs the usage flow from starting user operation 1042 to user operation 1272. User operation 1272 performs incorporating the received response request message from the identified user into the regulatory analysis message. Arrow 1274 directs usage from user operation 1272 to user operation 1276. User operation 1276 terminates the usage of this flowchart.

Certain other further embodiments include creating the regulatory analysis. message based upon a routed preliminary regulatory analysis message as a rule compliant preliminary message.

Figure 11A:
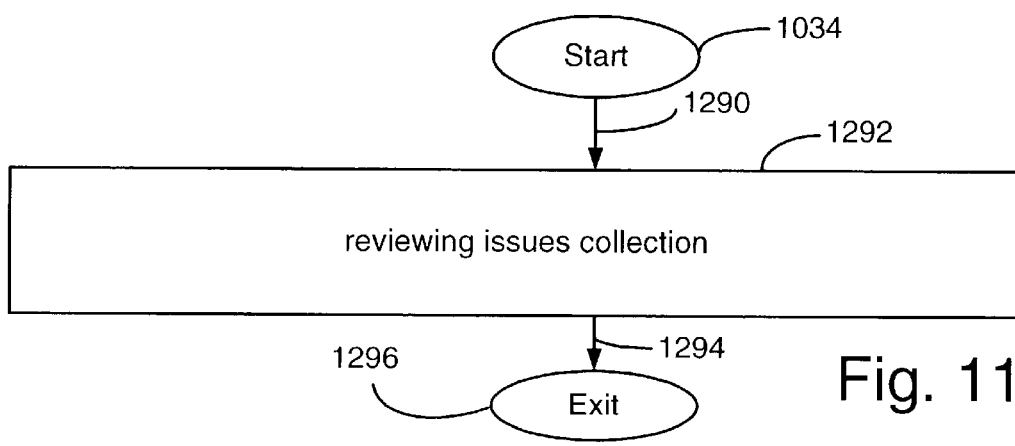
FIG. 11A depicts a detail flowchart of user operation 1034 of FIG. 5A further performing identifying the issues in accordance with certain embodiments.

FIG. 11A depicts a detail flowchart of user operation 1034 of FIG. 5A further performing identifying the issues in accordance with certain embodiments.

Arrow 1290 directs the usage flow from starting user operation 1034 to user operation 1292. User operation 1292 performs reviewing the issue collection. Arrow 1294 directs usage from user operation 1292 to user operation 1296. User operation 1296 terminates the usage of this flowchart.

Figure 11B:
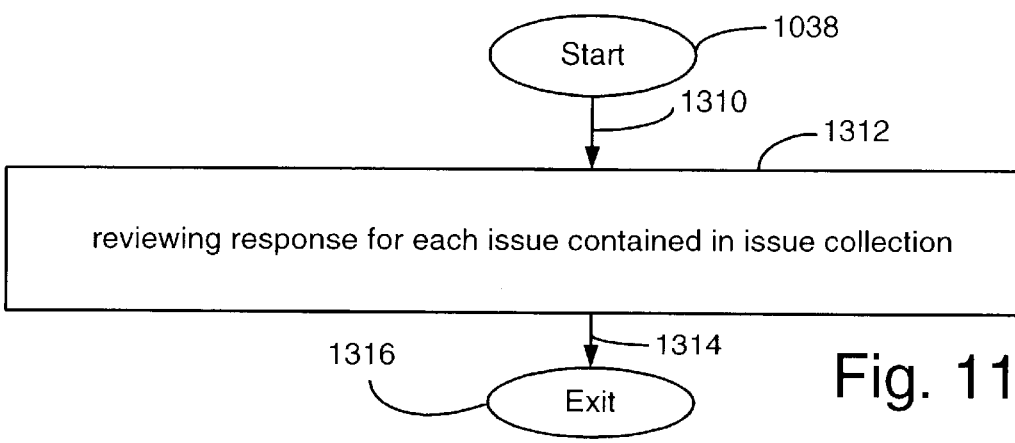
FIG. 11B depicts a detail flowchart of user operation 1038 of FIG. 5A further performing responding to each of the issues in accordance with certain embodiments.

FIG. 11B depicts a detail flowchart of user operation 1038 of FIG. 5A further performing responding to each of the issues in accordance with certain embodiments.

Arrow 1310 directs the usage flow from starting user operation 1038 to user operation 1312. User operation 1312 performs reviewing the response for each of the issues contained in the issue collection. Arrow 1314 directs usage from user operation 1312 to user operation 1316. User operation 1316 terminates the usage of this flowchart.

Figure 11C:
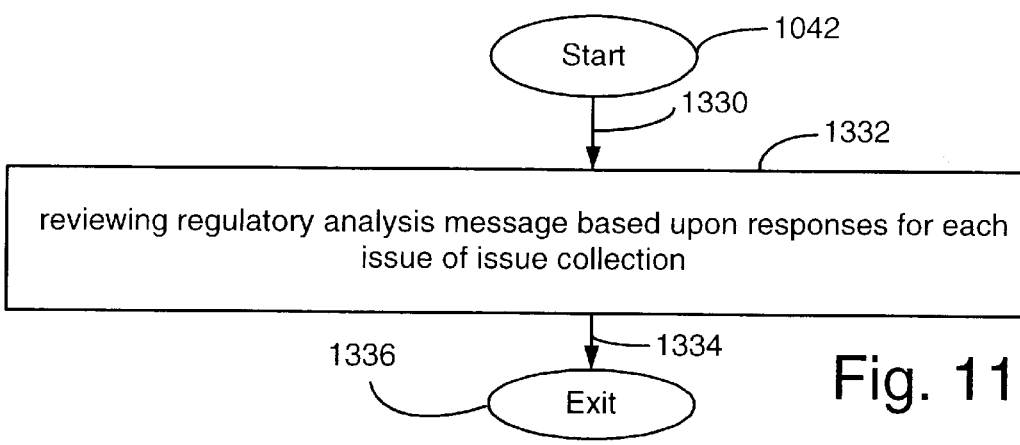
FIG. 11C depicts a detail flowchart of user operation 1042 of FIG. 5A further performing creating the regulatory analysis message in accordance with certain embodiments.

FIG. 11C depicts a detail flowchart of user operation 1042 of FIG. 5A further performing creating the regulatory analysis message in accordance with certain embodiments.

Arrow 1330 directs the usage flow from starting user operation 1042 to user operation 1332. User operation 1332 performs reviewing the regulatory analysis message based upon the responses for each of the issues of the issue collection. Arrow 1334 directs usage from user operation 1332 to user operation 1336. User operation 1336 terminates the usage of this flowchart.

Figure 12A:
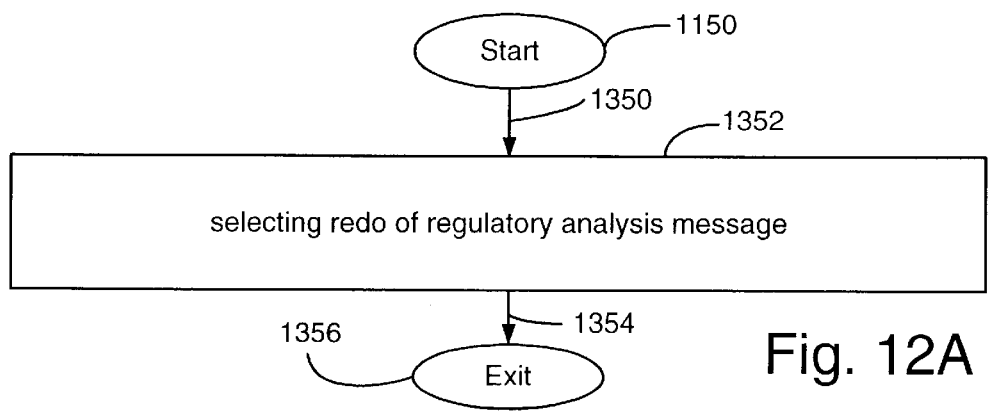
FIG. 12A depicts a detail flowchart of user operation 1332 of FIG. 11C further performing reviewing the regulatory analysis message in accordance with certain embodiments.

FIG. 12A depicts a detail flowchart of user operation 1332 of FIG. 11C further performing reviewing the regulatory analysis message in accordance with certain embodiments.

Arrow 1350 directs the usage flow from starting user operation 1332 to user operation 1352. User operation 1352 performs selecting a redo of the regulatory analysis message. Arrow 1354 directs usage from user operation 1352 to user operation 1356. User operation 1356 terminates the usage of this flowchart.

Certain further embodiments include a method of operating a computing system comprised of at least one computer supporting the method of using the messaging interface by the agent as described in FIGS. 1–3 and 5–12A above. Certain further embodiments include a program operating system composed of program code segments residing on a computer memory accessibly coupled to the computer of the computing system communicating with the agent and supporting this method of operating the computing system.

Certain other embodiments include a computing system insuring compliance of a regulatory rule set for messages generated by an agent of an enterprise comprising at least one computer with accessibly coupled memory communicating with the agent. A program operating system containing program code segments residing in computer readable memory accessibly coupled to at least a computer insures compliance of the regulatory rule set for messages generated by the agent by program code segments as disclosed in FIGS. 5–21A.

Figure 12B:
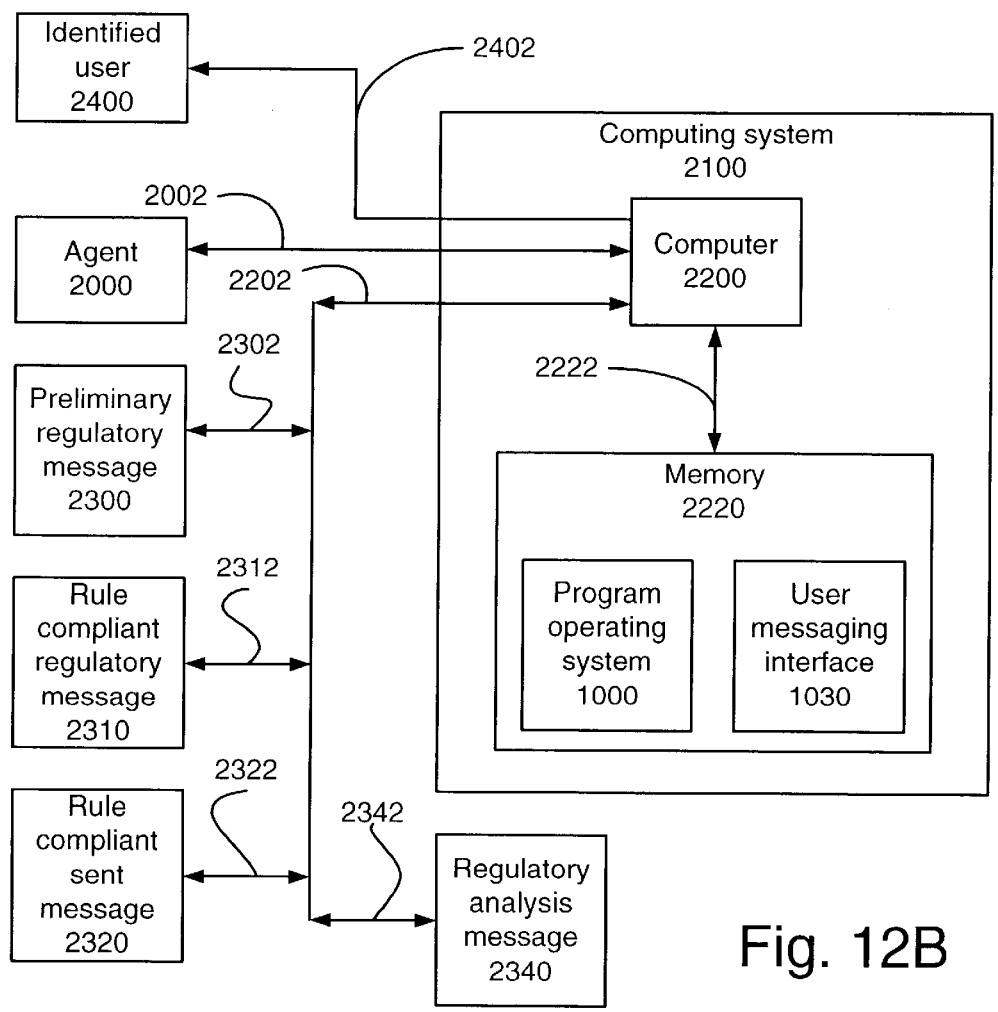
FIG. 12B depicts a block diagram of computing system 2100 insuring compliance of a regulatory rule set for messages 2300, 2310, 2320 and 2340 generated by agent 2000 of an enterprise comprising at least one computer 2200 with accessibly coupled 2222 memory 2220 communicating 2002 with agent 2000, in accordance with certain embodiments.

FIG. 12B depicts a block diagram of computing system 2100 insuring compliance of a regulatory rule set for messages 2300, 2310, 2320 and 2340 generated by agent 2000 of an enterprise comprising at least one computer 2200 with accessibly coupled 2222 memory 2220 communicating 2002 with agent 2000, in accordance with certain embodiments.

In certain embodiments, memory 2220 contains program code segments comprising at least the program operating system 1000 as disclosed herein. In such embodiments, messages 2300, 2310 and 2320 are coupled 2302, 2312 and 2322, respectively, to computer 2200 supporting access and creation of these messages.

In certain embodiments, memory 2220 further contains program code segments comprising user messaging interface 1030 as disclosed herein. In such embodiments, message 2340 is coupled 2342 to computer 2200 supporting access and creation of the message.

In certain further embodiments, memory 2220 contains program code segments comprising at least the program operating system 1000 and user messaging interface 1030 as disclosed herein.

As used herein, a computer will refer to at least instruction processors. Instruction processors will refer to at least Multiple Instruction Multiple Datapath (MIMD), Single Instruction Multiple Datapath (SIMD), Multiple Instruction Single Datapath (MISD) and Single Instruction Single Datapath (SISD) instruction processors. For the sake of simplifying the discussion, Multiple Instruction processors will be considered comprised of more than one Single Instruction processors. As used herein, Single Instruction processors will include but not be limited to microprocessors. Microprocessors as used herein will include but not be limited to scalar and super-scalar microprocessors. Microprocessors as used herein include but are not limited to Reduced Instruction Set Computers (RISC) and Complex Instruction Set Computer (CISC). Microprocessors as used herein also include but are not limited to Digital Signal Processors (DSP).

As used herein, an instruction processor will be controlled by the state of at least one instruction at a given time. Such instructions may be in the native instruction format of the instruction processor, or may be in an, interpretive format. Examples of such interpretive formats include but are not limited to JAVA, HTML, FORTH, and MPEG formats.

As used herein, a computer will also refer to at least inference engines. Inference engines as used herein will refer to at least rule based inference engines, artificial neural networks and fuzzy logic inference engines. Inference engines, as used herein, are controlled by an inference rule base and a fact list, deriving their change of state through application of the inference rule base to the fact list to derive new facts, which may themselves be then applied or used to modify the inference rule base. As used herein, instructions for inference engines will include but not be limited to actions applied to either the inference rule base or to the fact list which alter either or both the inference rule base or the fact list.

As used herein a computer also refers to at least closely coupled collections of computers as just described. By way of example, it is not uncommon for a personal computer to have a super-scalar microprocessor, with a dedicated DSP embedded in a modem, and often a second dedicated system component including a microprocessor or DSP interpreting MPEG video streams for realtime presentations.

Each of these computers has the property of either including accessibly coupled computer memory or being externally, accessibly coupled to computer memory from which instructions are fetched.

A computer system as used herein will include but not be limited to a communicatively coupled collection of at least one computer. When a computer system includes more than one computer, the communicative coupling may either be continuous or occasional to any one of the computers. The communicative coupling between any two computers of the computing system need not be the same as between a different pair of computers. The communicative coupling between more than two computers may include a collective coupling of these computers. Such collective couplings may further possess a consistent communications protocol and will be referred to herein as networks. Note that the communicative couplings within a computing system, and within a network, may employ more than one physical transport layer. Such physical transport layers will be considered to include at least wireless and wireline physical transport layers. Note further that networks as used herein may be further comprised of smaller networks communicating with each other through bridges, routers, gateways, which may further possess security filters including but not limited to firewalls.

As used herein, computing systems employing networks will further refer to networks interacting with server systems. Server systems, as used herein, will refer to a communicatively coupled collection of at least one server computer. At least one of the server computers of the server system will affect control of access by identified users operating computers within the computing system to the resources of the server system. Note that a computing system network may possess more than one server system.

As used herein, a program operating system controlling a computer system is comprised of at least one program code segment residing in accessibly coupled computer memory to a computer. Each program code segment as used herein will be considered comprised of at least one instruction. Note that in certain embodiments, the program code segments of the program operating system controlling the computing system may reside on more than one computer.

Continuing with the discussion of the operational method embodiments based at least in part on the discussion of the flowchart of FIG. 4.

Figure 13A:
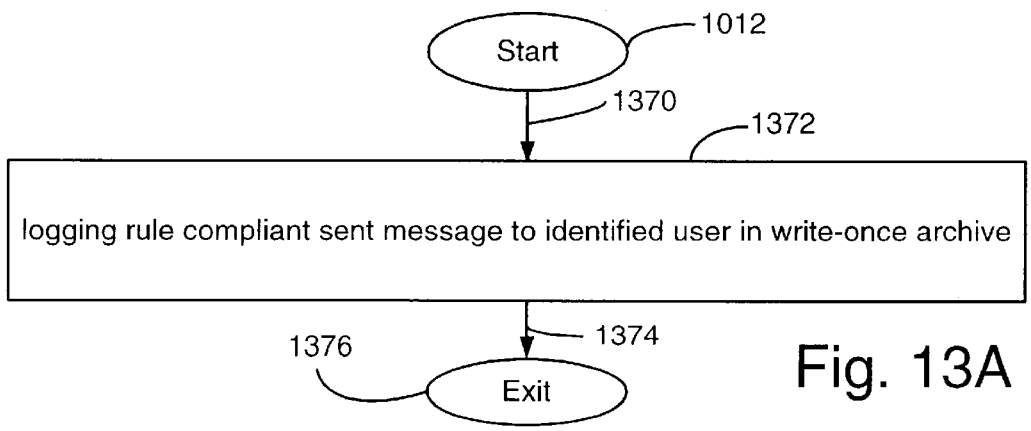
FIG. 13A depicts a detail flowchart of operation 1012 of FIG. 4 further performing sending rule compliant preliminary message in accordance with certain embodiments.

FIG. 13A depicts a detail flowchart of operation 1012 of FIG. 4 further performing sending rule compliant preliminary message in accordance with certain embodiments.

Arrow 1370 directs the flow of execution from starting operation 1008 to operation 1372. Operation 1372 performs logging the rule compliant sent message to the identified user in a write-once archive. Arrow 1374 directs execution from operation 1372 to operation 1376. Operation 1376 terminates the'operations of this flowchart.

Figure 13B:
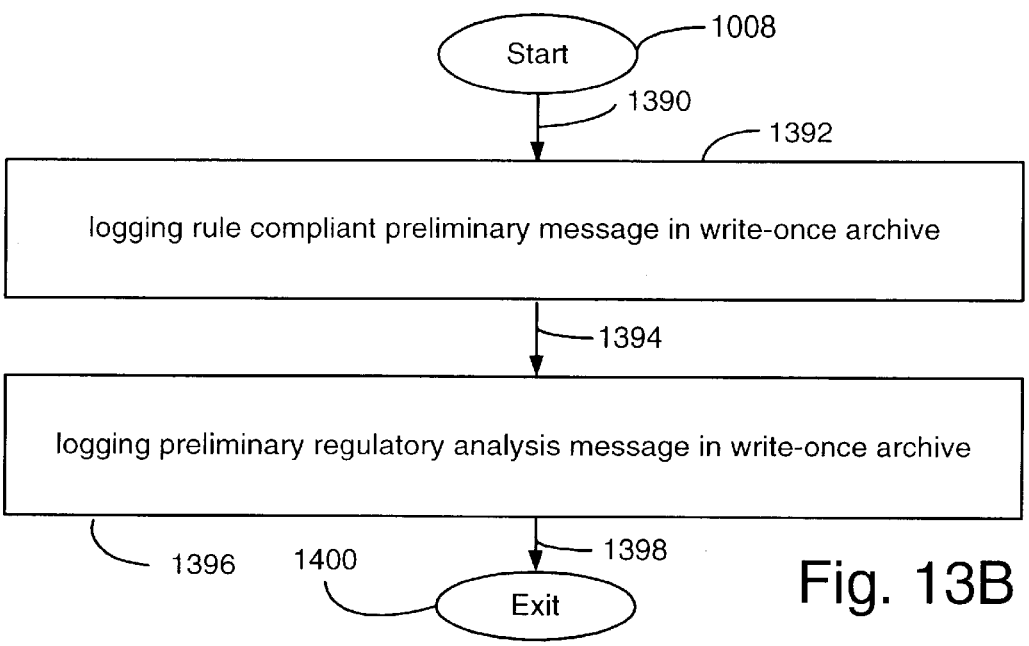
FIG. 13B depicts a detail flowchart of operation 1008 of FIG. 4 further performing sending preliminary regulatory analysis message in accordance with certain embodiments.

FIG. 13B depicts a detail flowchart of operation 1008 of FIG. 4 further performing sending preliminary regulatory analysis message in accordance with certain embodiments.

Arrow 1390 directs the flow of execution from starting operation 1008 to operation 1392. Operation 1392 performs flogging the rule compliant preliminary message in the write-once archive. Arrow 1394 directs execution from operation 1392 to operation 1396. Operation 1396 performs logging the preliminary regulatory analysis message in the write-once archive. Arrow 1398 directs execution from operation 1396 to operation 1400. Operation 1400 terminates the operations of this flowchart.

Figure 14B:
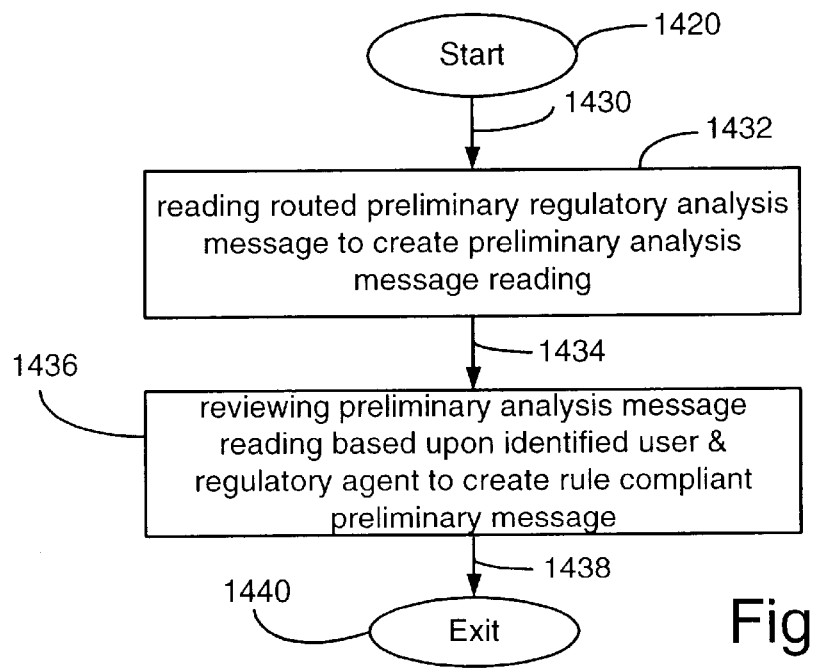
FIG. 14B depicts a detail flowchart of operation 1420 of FIG. 14A further performing processing routed preliminary regulatory analysis message in accordance with certain embodiments.
Figure 14A:
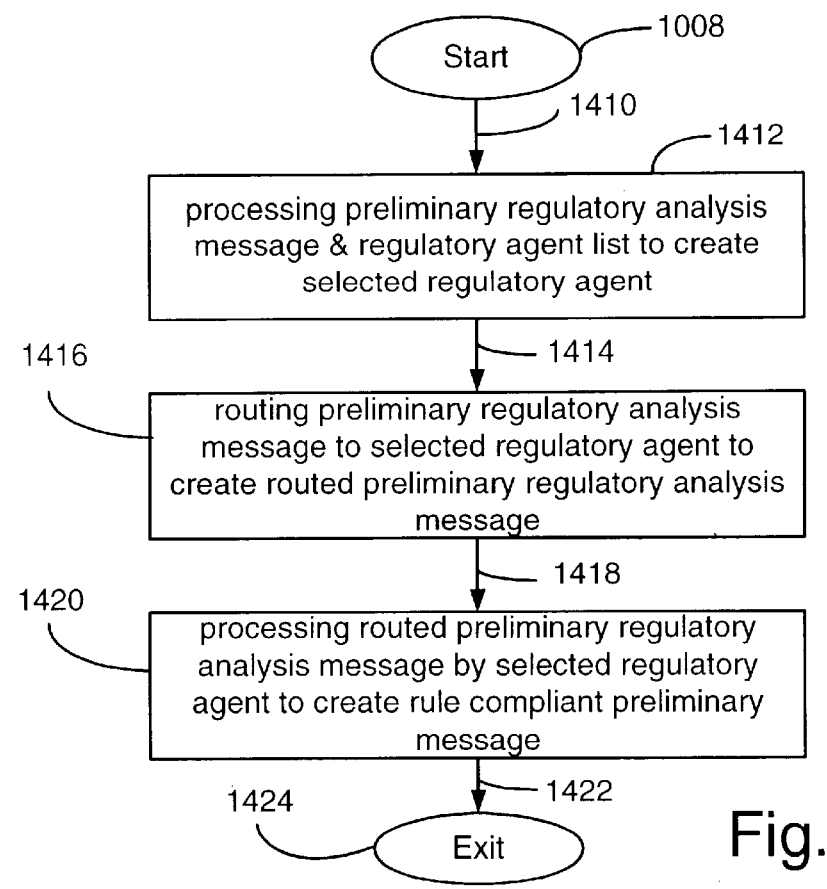
FIG. 14A depicts a detail flowchart of operation 1008 of FIG. 4 further performing sending preliminary regulatory analysis message in accordance with certain embodiments.

FIG. 14A depicts a detail flowchart of operation 1008 of FIG. 4 further performing sending preliminary regulatory analysis message in accordance with certain embodiments.

Arrow 1410 directs the flow of execution from starting operation 1008 to operation 1412. Operation 1412 performs processing the preliminary regulatory analysis message and a regulatory agent list containing at least one regulatory agent to create a selected regulatory agent. Arrow 1414 directs execution from operation 1412 to operation 1416. Operation 1416 performs routing the preliminary regulatory analysis message to the selected regulatory agent to create a routed preliminary regulatory analysis message. Arrow 1418 directs execution from operation 1416 to operation 1420. Operation 1420 performs processing the routed preliminary regulatory analysis message by the selected regulatory agent to create the rule compliant preliminary message. Arrow 1422 directs execution from operation 1420 to operation 1424. Operation 1424 terminates the operations of this flowchart.

FIG. 14B depicts a detail flowchart of operation 1420 of FIG. 14A further performing processing routed preliminary regulatory analysis message in accordance with certain embodiments.

Arrow 1430 directs the flow of execution from starting operation 1420 to operation 1432. Operation 1432 performs reading the routed preliminary regulatory analysis message to create, a preliminary analysis message reading. Arrow 1434 directs execution from operation 1432 to operation 1436. Operation 1436 performs reviewing the preliminary analysis message reading based upon the identified user and based upon the regulatory agent to create the rule compliant preliminary message. Arrow 1438 directs execution from operation 1436 to operation 1440. Operation 1440 terminates the operations of this flowchart.

FIG. 15A depicts a detail flowchart of operation 1436 of FIG. 14B further performing reviewing preliminary analysis message reading in accordance with certain embodiments.

Arrow 1450 directs the flow of execution from starting operation 1436 to operation 1452. Operation 1452 performs reviewing the preliminary analysis message, reading based upon the identified user and based upon the regulatory agent accessing a regulatory rule base to create the rule compliant preliminary message. Arrow 1454 directs execution from operation 1452 to operation 1456. Operation 1456 terminates the operations of this flowchart.

FIG. 15B depicts a detail flowchart of operation 1436 of FIG. 14B further performing reviewing the preliminary analysis message reading in accordance with certain embodiments.

Arrow 1470 directs the flow of execution from starting operation 1436 to operation 1472. Operation 1472 performs the regulatory agent using a messaging interface to create the rule compliant preliminary message based upon the preliminary analysis message reading and based upon the identified user. Arrow 1474 directs execution from operation 1472 to operation 1476. Operation 1476 terminates the operations of this flowchart.

Note that certain further embodiments include the selected regulatory agent as a software agent.

Figure 16A:
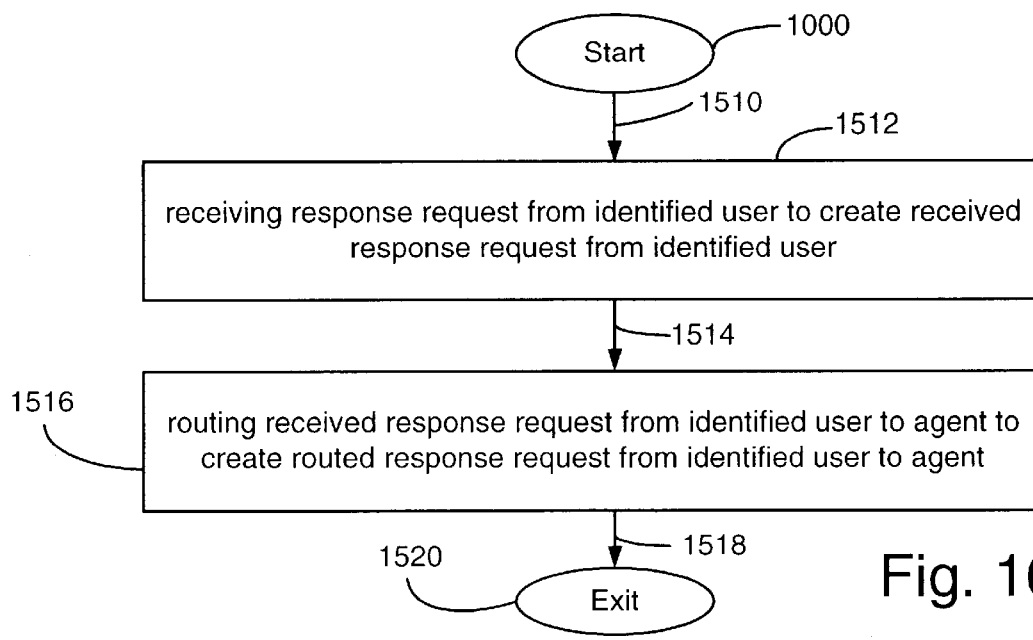
FIG. 16A depicts a detail flowchart of operation 1000 of FIG. 4 further performing method of insuring compliance of the regulatory rule set for messages generated by at least one agent in accordance with certain embodiments.

FIG. 16A depicts a detail flowchart of operation 1000 of FIG. 4 further performing method of insuring compliance of the regulatory rule set for messages generated by at least one agent in accordance with certain embodiments.

Arrow 1510 directs the flow of execution from starting operation 1000 to operation 1512. Operation 1512 performs receiving a response request from the identified user to create a received response request from the identified user. Arrow 1514 directs execution from operation 1512 to operation 1516. Operation 1516 performs routing the received response request from the identified user to the agent to create a routed response request from the identified user to the agent. Arrow 1518 directs execution from operation 1516 to operation 1520. Operation 1520 terminates the operations of this flowchart.

Figure 16B:
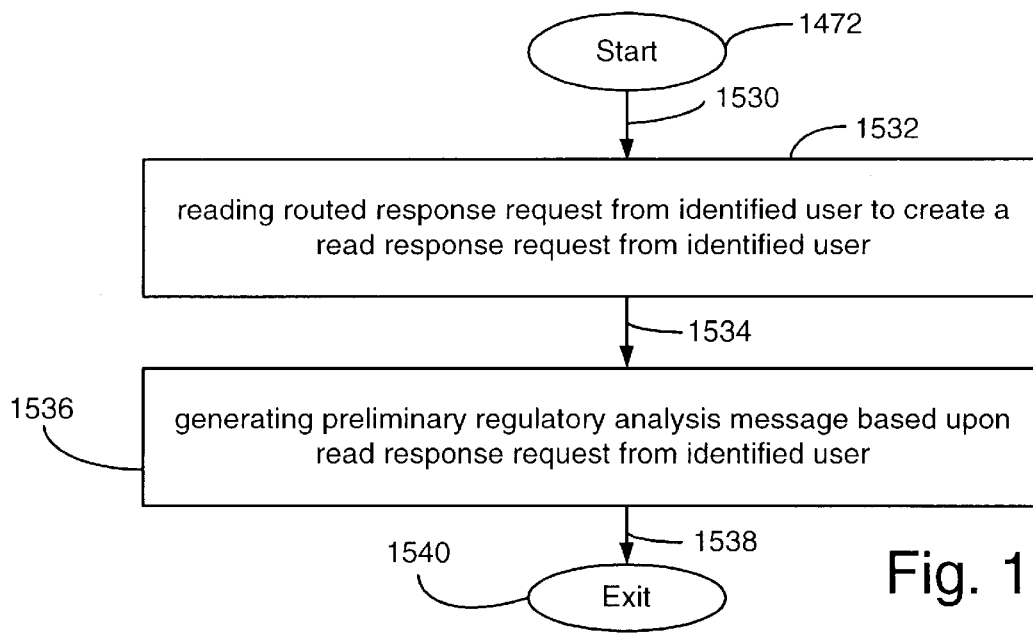
FIG. 16B depicts a detail flowchart of operation 1472 of FIG. 15B further performing using the messaging interface by the agent in accordance with certain embodiments.

FIG. 16B depicts a detail flowchart of operation 1472 of FIG. 15B further performing using the messaging interface by the agent in accordance with certain embodiments.

Arrow 1530 directs the flow of execution from starting operation 1472 to operation 1532. Operation 1532 performs reading the routed response request from the identified user to create a read response request from the identified user. Arrow 1534 directs execution from operation 1532 to operation 1536. Operation 1536 performs generating the preliminary regulatory analysis message based upon the read response request from the identified user. Arrow 1538 directs execution from operation 1536 to operation 1540. Operation 1540 terminates the operations of this flowchart.

Figure 17A:
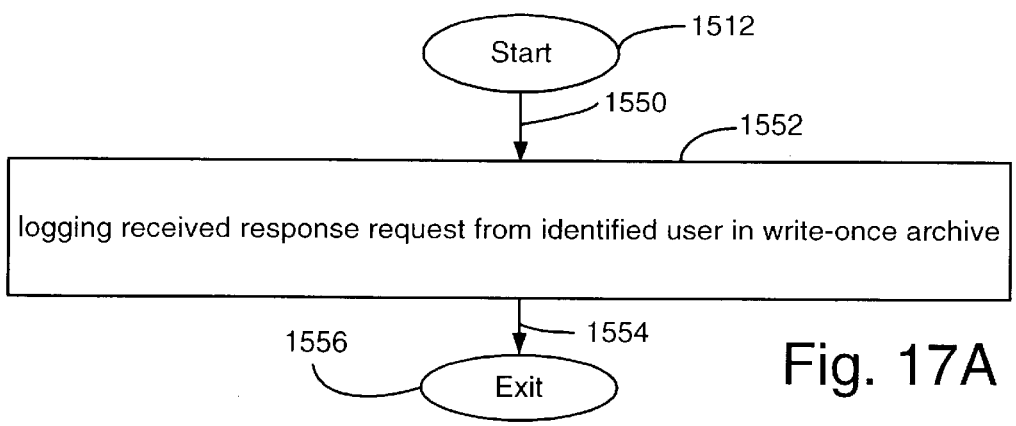
FIG. 17A depicts a detail flow chart of operation 1512 of FIG. 16A further performing receiving the response request in accordance with certain embodiments.

FIG. 17A depicts a detail flowchart of operation 1512 of FIG. 16A further performing receiving the response request in accordance with certain embodiments.

Arrow 1550 directs the flow of execution from starting operation 1512 to operation 1552. Operation 1552 performs logging the received response request from the identified user in the write-once archive. Arrow 1554 directs execution from operation 1552 to operation 1556. Operation 1556 terminates the operations of this flowchart.

Figure 17B:
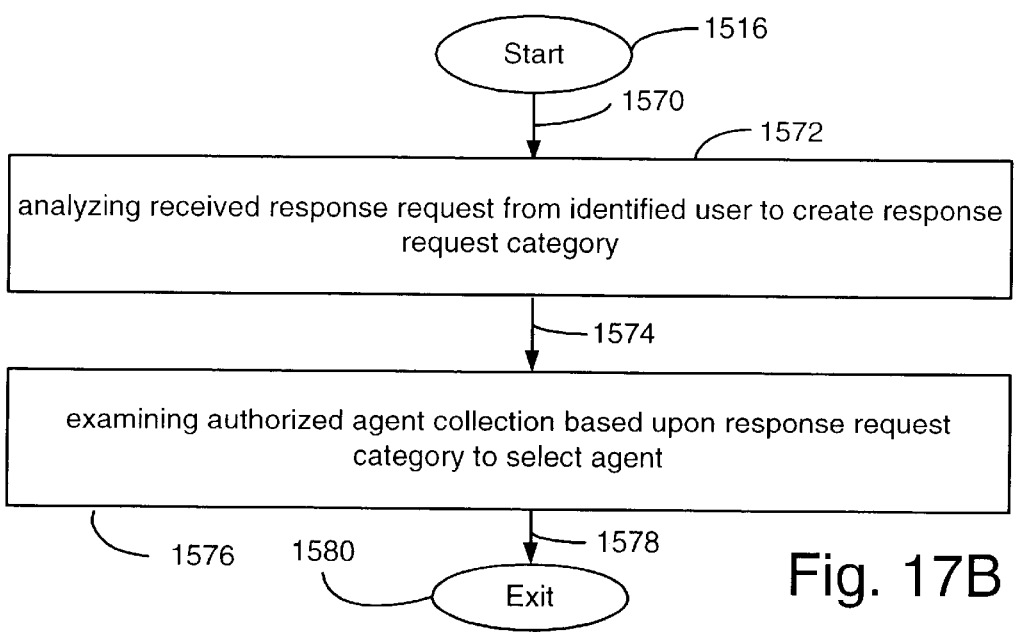
FIG. 17B depicts a detail flowchart of operation 1516 of FIG. 16A further performing routing the received response request in accordance with certain embodiments.

FIG. 17B depicts a detail flowchart of operation 1516 of FIG. 16A further performing routing the received response request in accordance with certain embodiments.

Arrow 1570 directs the flow of execution from starting operation 1516 to operation 1572. Operation 1572 performs analyzing the received response request from the identified user to create a response request category. Arrow 1574 directs execution from operation 1572 to operation 1576. Operation 1576 performs examining an authorized agent collection of authorized agents based upon the response request category to select the agent. Arrow 1578 directs execution from operation 1576 to operation 1580. Operation 1580 terminates the operations of this flowchart.

Figure 18A:
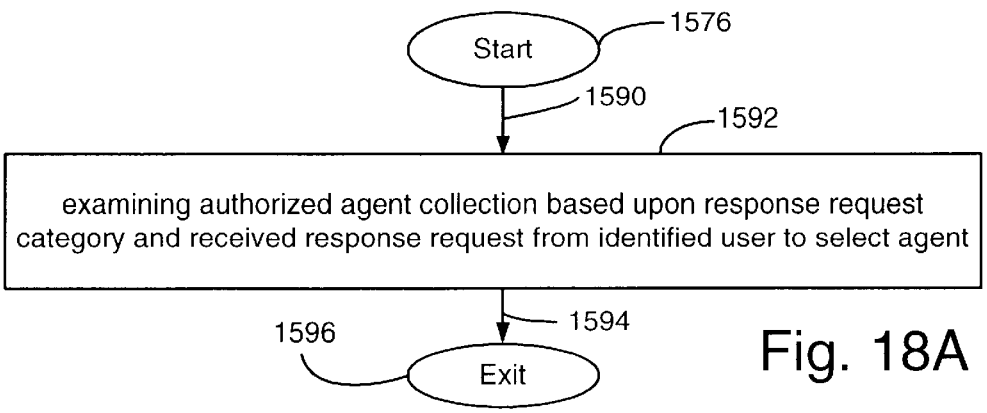
FIG. 18A depicts a detail flowchart of operation 1576 of FIG. 17B further performing examining the authorized agent collection in accordance with certain embodiments.

FIG. 18A depicts a detail flowchart of operation 1576 of FIG. 17B further performing examining the authorized agent collection in accordance with certain embodiments.

Arrow 1590 directs the flow of execution from starting operation 1576 to operation 1592. Operation 1592 performs examining an authorized agent collection of authorized agents based upon the response request category and based upon received response request from the identified user to select the agent. Arrow 1594 directs execution from operation 1592 to operation 1596. Operation 1596 terminates the operations of this flowchart.

Figure 18B:
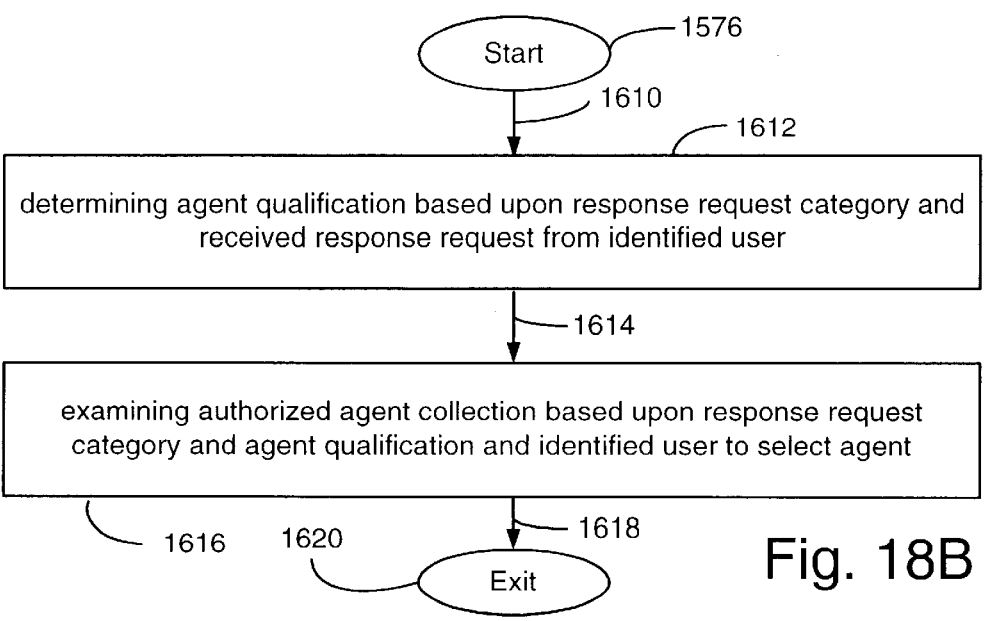
FIG. 18B depicts a detail flowchart of operation 1576 of FIG. 17B further performing examining the authorized agent collection in accordance with certain embodiments.

FIG. 18B depicts a detail flowchart of operation 1576 of FIG. 17B further performing examining the authorized agent collection in accordance with certain embodiments.

Arrow 1610 directs the flow of execution from starting operation 1576 to operation 1612. Operation 1612 performs determining an agent qualification based upon the response request category and based upon the received response request from the identified user. Arrow 1614 directs execution from operation 1612 to operation 1616. Operation 1616 performs examining an authorized agent collection of authorized agents based upon the response request category and based upon the agent qualification and based upon the identified user to select the agent. Arrow 1618 directs execution from operation 1616 to operation 1620. Operation 1620 terminates the operations of this flowchart.

Certain other embodiments include a process of making a regulatory analysis engine to an agent collection containing at least two agents of an enterprise for a regulation collection containing at least one regulation.

A regulatory analysis engine contains a certification collection of certifications, a possible issue collection of issues and a routing process for routing a regulatory compliance message with an associated issue collection to a message portal list containing at least a sent-out portal.

Figure 19:
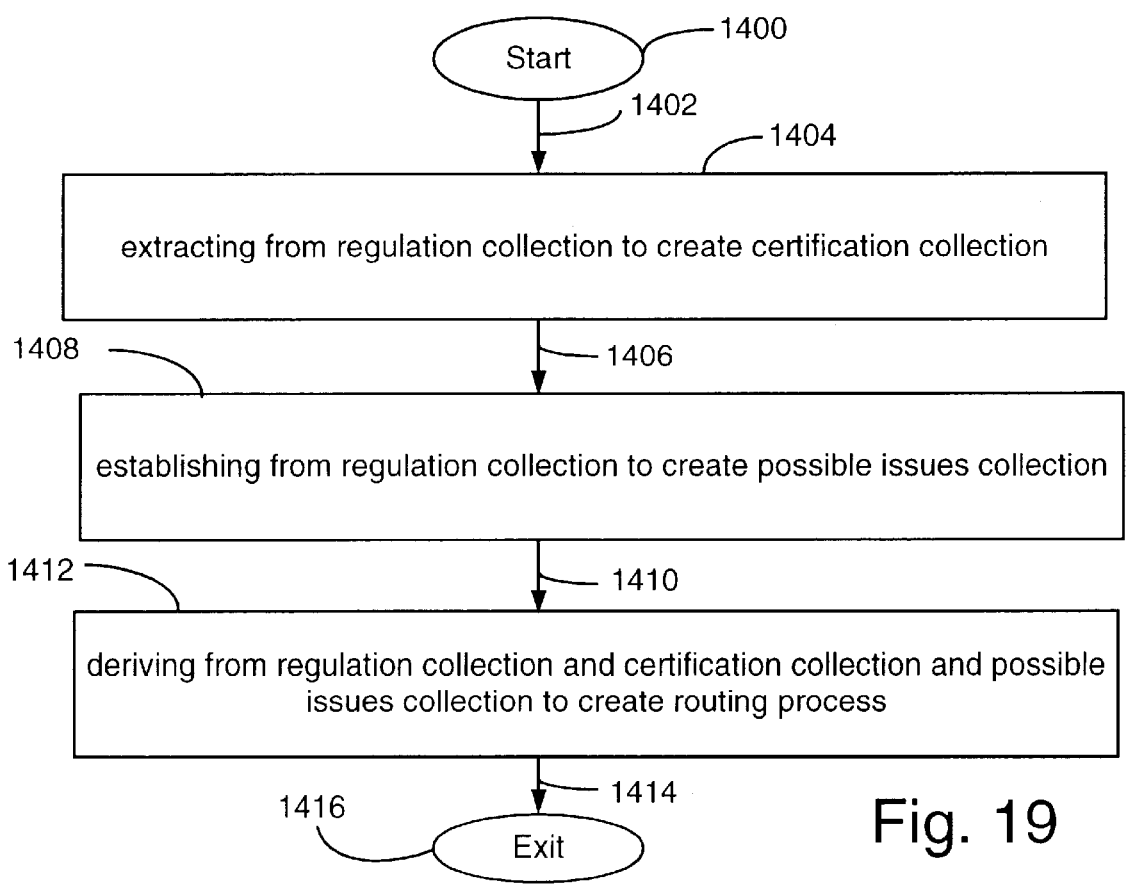
FIG. 19 depicts a flowchart performing process of making a regulatory analysis engine to an agent collection containing of an enterprise for a regulation collection in accordance with certain embodiments.

FIG. 19 depicts a flowchart performing process of making a regulatory analysis engine to an agent collection containing of an enterprise for a regulation collection in accordance with certain embodiments.

Operation 1400 starts the operations of this flowchart. Arrow 1402 directs the flow of execution from operation 1400 to operation 1404. Operation 1404 performs extracting from the regulation collection to create the certification collection. Arrow 1406 directs execution from operation 1404 to operation 1408. Operation 1408 performs establishing from the regulation collection to create the possible issue collection. Arrow 1410 directs execution from operation 1408 to operation 1412. Operation 1412 performs deriving from the regulation collection and from the certification collection and from the possible issue collection to create the routing process. Arrow 1414 directs execution from operation 1412 to operation 1416. Operation 1416 terminates the operations of this flowchart.

Figure 20:
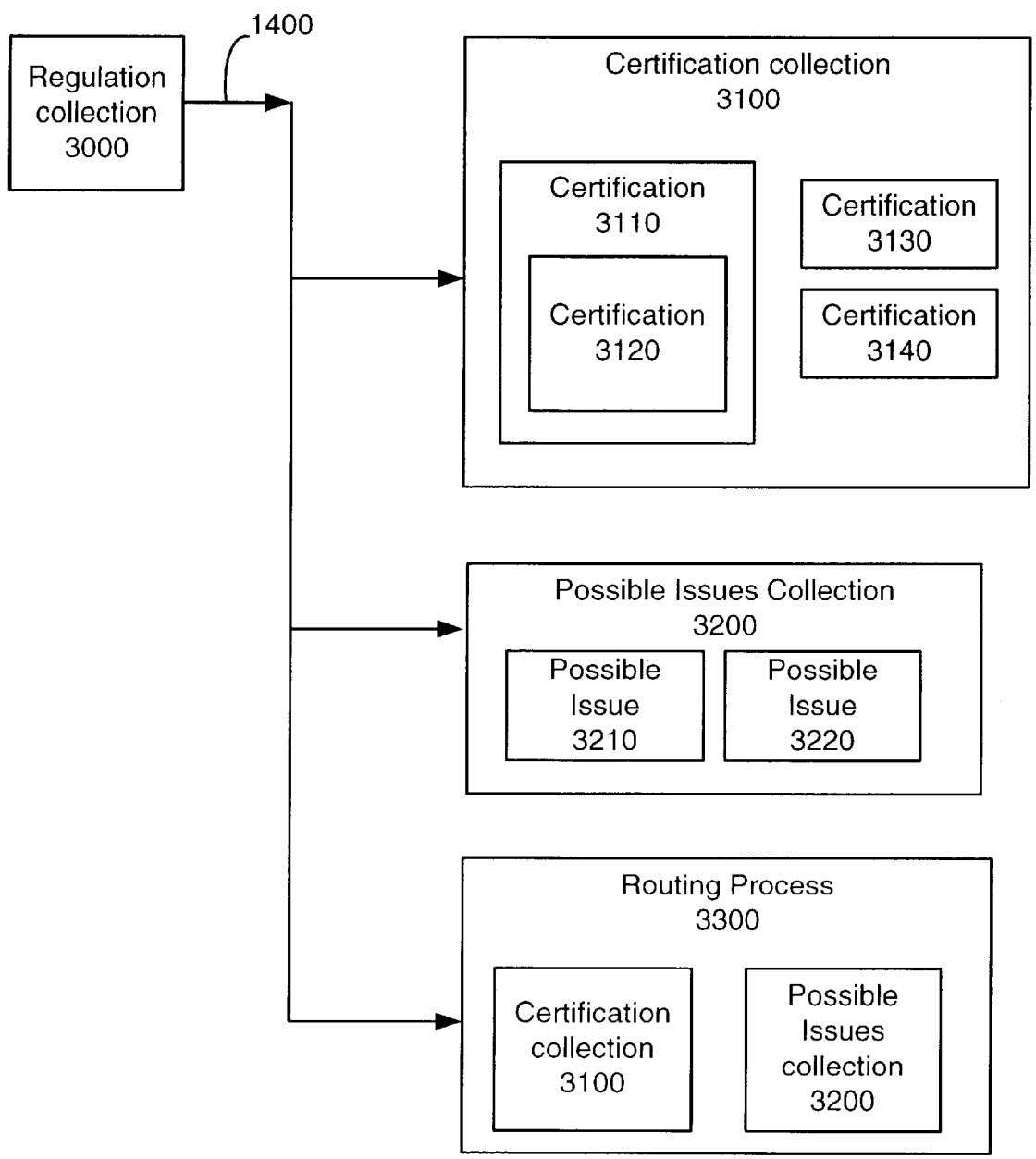
FIG. 20 depicts the results of applying the process of FIG. 19 to a regulation collection 3000 and generating a certification collection 3100, possible issue collection 3200 and routing process 3300 which relies upon certification collection 3100 and possible issue collection 3200, in accordance with certain embodiments.

FIG. 20 depicts the results of applying the process of FIG. 19 to a regulation collection 3000 and generating a certification collection 3100, possible issue collection 3200 and routing process 3300 which relies upon certification collection 3100 and possible issue collection 3200, in accordance with certain embodiments.

Certification collection 3100 contains at least two certifications. In certain further embodiments, some of these certifications may have an ordering such as indicated by example in this figure with certification 3110 and certification 3120. In this case, certification 3110 is denoted as surrounding certification 3120. Certification 3120 will be described as a "higher" certification than certification 3110. This means that an agent with certification 3120 is responsible and qualified to act at a higher level than an agent with certification 3110. Certifications 3130 and 3140 are seen as essentially independent of each other. Examples of such independent certifications may include but are not limited to a corporate level standing as an employee and as a full time contract employee within the same corporate unit.

Note that in certain embodiments, there may be multiple nested certifications. By way of example, a financial trading company might have customer service personnel, customer service personnel with Series 7 Securities and Exchange Commission Certification, and customer service personnel with Series 8 Securities and Exchange Commission Certification. A financial trading company might also have book keepers, Certified Public Accountants, Finance Managers, Finance Executives and a Chief Financial Officer, as well. In each of these cases, the responsibilities and qualifications of the agent grow as the certification level grows.

Possible issue collection 3200 contains at least two possible issues. These issues reflect at least issues which the enterprise is required to report regarding regulation compliance, as specified by regulation collection.

Routing Process 3300 directs regulatory analysis messages based upon the certification collection 3100 and possible issue collection 3200. These routing processes will be described by example hereinafter.

Note that in certain embodiments, regulation collection 3000 may be from a government. In certain further embodiments, regulation collection 3000 may be from a collection of governments.

In certain other embodiments, regulation collection 3000 may be from a collection or consortia of enterprises. In certain further embodiments, regulation collection 3000 may be from an enterprise consortia including the enterprise for which regulation compliance is desired.

In certain other embodiments, regulation collection 3000 may be the policy regulations of the enterprise or of a parent enterprise having at least partial control over the enterprise.

Figure 21A:
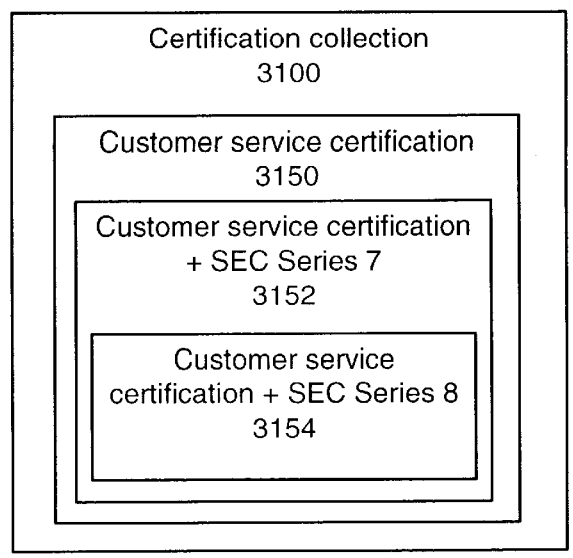
FIG. 21A depicts a certification collection 3100 including customer service personnel 3150, customer service personnel with Series 7 Securities and Exchange Commission Certification 3152, and customer service personnel with Series 8 Securities and Exchange Commission Certification 3154.

FIG. 21A depicts a certification collection 3100 including customer service personnel 3150, customer service personnel with Series 7 Securities and Exchange Commission Certification 3152, and customer service personnel with Series 8 Securities and Exchange Commission Certification 3154.

Figure 21B:
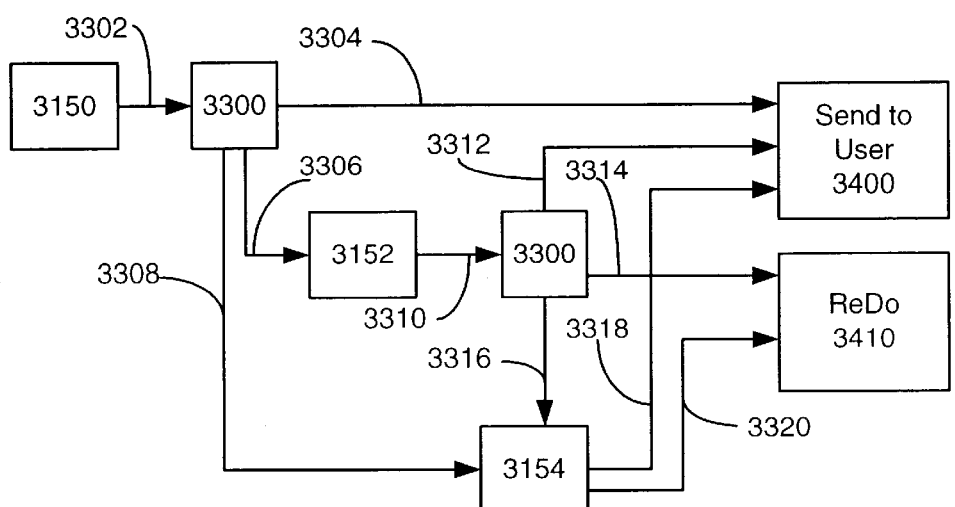
FIG. 21B depicts an exemplary regulatory analysis engine based upon certification 3100 of FIG. 21A, in accordance with certain embodiments.

FIG. 21B depicts an exemplary regulatory analysis engine based upon certification 3100 of FIG. 21A, in accordance with certain embodiments.

Routing process 3300 begins when an agent 3150 activates the Send 108 function. Once the Send 108 function is activated, the routing process 3300 looks to see if the agent 3150 is on or off of general required review. If an agent 3150 has demonstrated a sustained ability to produce high quality work, they are taken off of general required review and their work is not reviewed, in general, before it is sent to user 3400.

All other message replies are forwarded to the Series 7 agent 3306 for review by an agent with a Series 7 license 3152. In certain further embodiments, all message that are marked as complaints are forwarded 3308 to the Series 8 agent 3154 to be reviewed and signed off on by an agent with a Series 8 license 3154.

In certain further embodiments, an agent 3150 may select for the regulatory analysis message 2340 to be reviewed by an agent with Series 7 certification 3152. Similarly, an agent with Series 7 certification 3152 may select for the regulatory analysis message 2340 to be reviewed by an agent with Series 8 certification 3154.

In certain other further embodiments, the issue collection associated with the regulatory analysis message may be used by the routing process 3300 to direct the regulatory analysis message to a higher level of review before being sent to a user 3400.

Note that in certain embodiments, an enterprise may contain multiple departments utilizing agents with common certifications. It is common for instance in financial trading companies that multiple departments may include employee customer service personnel 3150, customer service personnel with Series 7 Securities and Exchange Commission Certification 3152, and customer service personnel with Series 8 Securities and Exchange Commission Certification 3154.

Note that in certain further embodiments, extremely low risk messages may not justify the cost of review and 3300 may further include a decision mechanism by which such low risk messages are sent to the users without review. By way of example, consider a situation in which one certified supervisor oversees the quality of 5 associates, who process 300 messages in a day. Assume that the total financial risk in these messages is several million dollars, but that 25% of the messages collectively account for five thousand dollars in risk. A filter keeping such messages from entering the queues 3152 and 3154 of senior agents are advantageous in optimizing a scarce human resource, the highly certified agents and their productivity in minimizing the overall corporate risk.

In certain further embodiments, an enterprise department may further have more than one agent able to process a specific kind of message. In certain further embodiments, there may be multiple agents, concurrently able to process such messages. In such embodiments, a common messaging queue may be employed allowing messages to be created by any of the concurrently available people.

Figure 22:
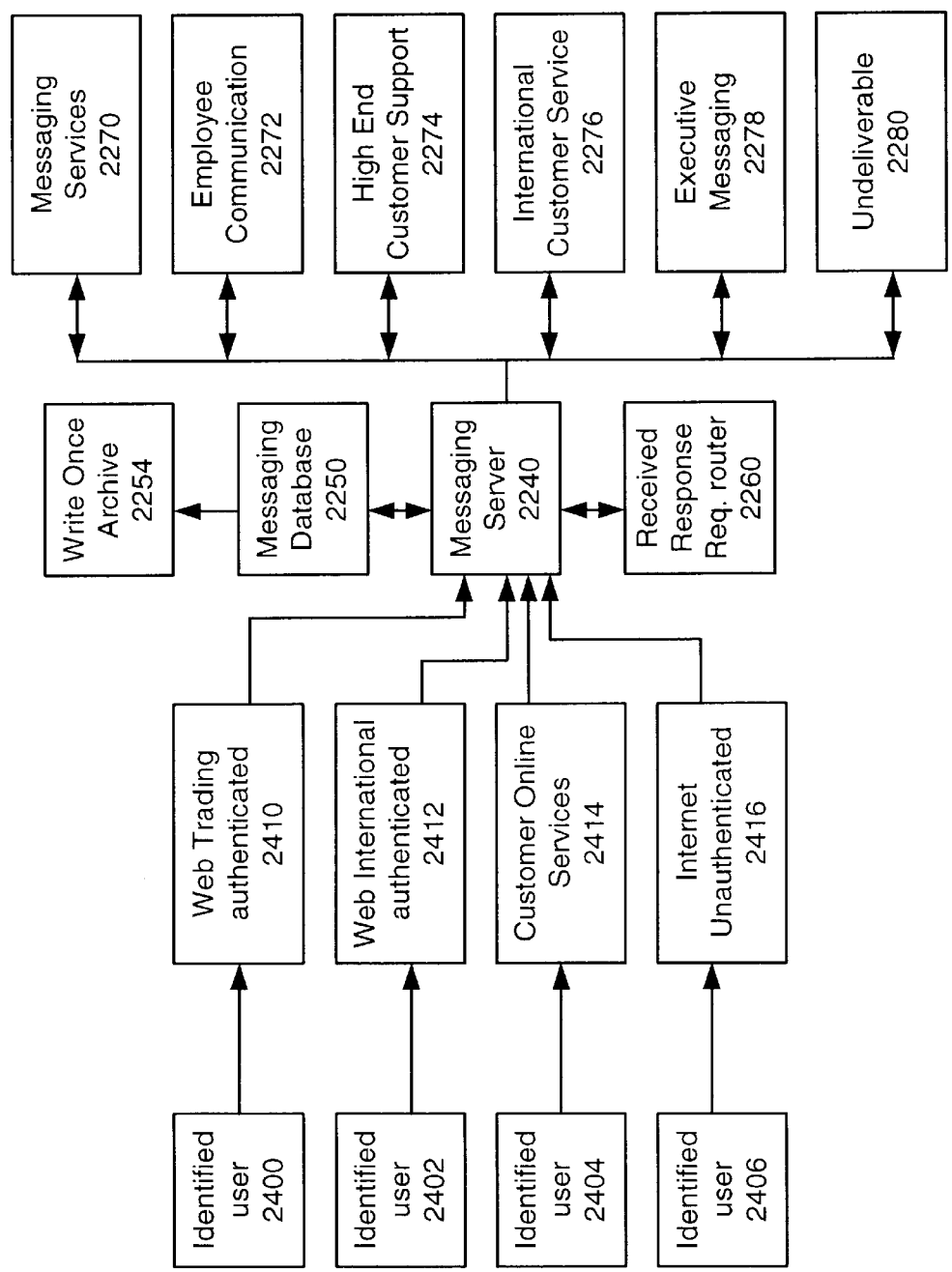
FIG. 22 depicts a systems flow diagram of a computing system including a server system containing a messaging server 2240, messaging database 2250, write once archive 2254, received response request router 2260, as well as several departments 2270–2280, and several messaging portals 2410–2416 through which response request messages from a collection of identified users 2400–2406 may be received.

FIG. 22 depicts a systems flow diagram of a computing system including a server system containing a messaging server 2240, messaging database 2250, write once archive 2254, received response request router 2260, as well as several departments 2270–2280, and several messaging portals 2410–2416 through which response request messages from a collection of identified users 2400–2406 may be received.

Note that in certain embodiments, each department may in fact contain several sub-departments, and that in certain cases, a department may be inactive and its immediately pressing response requests may be routed to a different department.

The preceding embodiments have been provided by way of example and are not meant to constrain the scope of the following claims.

What is claimed is:

1. A method of creating a regulatory analysis message is further comprised of the steps of:
   providing a messaging interface to an agent containing at least one field accessing a message queue based upon said agent to create said regulatory analysis message;
   identifying issues regarding said regulatory analysis message to create an issue collection containing at least one issue;
   responding to each of said issues contained in said issue collection to create an issue response for each issue; and
   creating said regulatory analysis message based upon said issues responses for each of said issues of said issue collection.

2. The method of claim 1, wherein said step of identifying issues further comprises the steps of:
   viewing a possible issue collection containing a possible issue;
   selecting a first of said possible issues contained in said possible issue collection to create a first of said issues in said issue collection.

3. The method of claim 2,
   wherein each of said possible issues of said possible issue collection is associated with a leaf of a possible issues tree;
   wherein said step selecting said first possible issues is further comprised of the step:
      selecting a branch-path to said leaf of said possible issues tree associated with said first possible issue.

4. The method of claim 2, wherein said step identifying issues further comprises the steps:
   selecting a first of said issues of said issue collection; and
   deleting said first issue from said issue collection.

5. The method of claim 2, wherein said step responding to each of said issues further comprises the steps:
   for each of said issues of said issue collection, creating a note list responding to said issue.

6. The method of claim 5,
   wherein for a first of said issues of said issue collection, said step creating said note list for said first issue is further comprised of the steps:
      creating a note text; and
      adding said note text to said note list responding to said first issue to create a response note to said first issue.

7. The method of claim 6, wherein said step creating said note text is further comprised of the step: creating said note text with a text editor.

8. The method of claim 6,
   wherein said step creating said note list for said first issue is further comprised of the steps:
      selecting a first of said response notes to said first issue in said note list for said first issue; and
      deleting said first response note from said note list for said first issue.

9. The method of claim 5,
   wherein said step responding to each of said issues is further comprised of the steps:
      selecting an article from a response knowledge base containing said article; and
      using said article to create said response to said issue.

10. The method of claim 9,
    wherein said step using said article further comprises the step of:
       adding said article to a response article list associated with said response to said issue.

11. The method of claim 1,
    wherein said step creating said regulatory analysis message is further comprised of the step:
       integrating said response of each of said issues of said issue collection to create said regulatory analysis message.

12. The method of claim 11,
    wherein said regulatory analysis message is created based upon a received response request message from an identified individual.

13. The method of claim 12,
    wherein said received response request message from said identified individual contains an initial issue collection containing at least one initial issue; and
    wherein said step identifying issues is further comprised of the step of:
       reviewing said initial issue collection to create said issue collection.

14. The method of claim 13,
wherein said step creating said regulatory analysis message is further comprised of the step:
  incorporating said received response request message from said identified user into said regulatory analysis message.

15. The method of claim 11,
wherein said regulatory analysis message is created based upon a routed preliminary regulatory analysis message as a rule compliant preliminary message.

16. The method of claim 15, wherein said step identifying issues is further comprised of the step: reviewing said issue collection.

17. The method of claim 15,
wherein said step responding to each of said issues is further comprised of the step:
  reviewing said response for each of said issues contained in said issue collection.

18. The method of claim 15,
wherein said step creating said regulatory analysis message is further comprised of the step:
reviewing said regulatory analysis message based upon said responses for each of said issues of said issue collection.

19. The method of claim 18,
wherein said step reviewing said regulatory analysis message is further comprised of the step:
  selecting a redo of said regulatory analysis message.

20. The method of claim 1,
wherein said agent has an associated regulatory certification level; and
wherein said queue based upon said agent is further based upon said associated regulatory certification level of said agent.

21. The method of claim 20,
wherein said agent has an associated department; and
wherein said queue based upon said agent and based upon said associated regulatory certification level is further based upon said associated department of said agent.

22. The method of claim 1,
wherein said agent has an associated department; and
wherein said queue based upon said agent is further based upon said associated department of said agent.

23. A program operating system composed of program code segments residing on a computer memory accessibly coupled to a computer of a computing system communicating with said agent and supporting said method of claim 1 comprised of the program code segments:
  providing said messaging interface to said agent containing said field accessing said message queue based upon said agent to create said regulatory analysis message;
  identifying issues regarding said regulatory analysis message to create an issue collection containing at least one issue;
  responding to each of said issues contained in said issue collection to create an issue response for each issue; and
  creating said regulatory analysis message based upon said issues responses for each of said issues of said issue collection.

24. A computing system supporting insuring compliance of a regulatory rule set for messages generated by an agent of an enterprise comprising:
  at least one computer with accessibly coupled memory communicating with said agent;
  wherein a program operating system containing program code segments residing in said memory accessibly coupled to said computer, comprising said program code segments supporting:
    providing a messaging interface to said agent containing at least one field accessing a message queue based upon said agent to create said regulatory analysis message;
    identifying issues regarding said regulatory analysis message to create an issue collection containing at least one issue;
    responding to each of said issues contained in said issue collection to create an issue response for each issue; and
    creating said regulatory analysis message based upon said issues responses for each of said issues of said issue collection.

25. A method of insuring compliance of a regulatory rule set for messages generated by at least one agent of an enterprise comprising the steps of:
  providing a messaging interface to said agent containing at least one field accessing a message queue based upon said agent to create said preliminary regulatory analysis message;
  sending said preliminary regulatory analysis message to a regulatory analysis engine to create a rule compliant preliminary message; and
  sending said rule compliant preliminary message to at least one identified user to create a rule compliant sent message to said identified user.

26. The method of claim 25,
wherein said step sending said rule compliant preliminary message is further comprised of the step:
  logging said rule compliant sent message to said identified user in a write-once archive.

27. The method of claim 26,
wherein said step sending said preliminary regulatory analysis message is further comprised of the steps:
  logging said rule compliant preliminary message in said write-once archive; and
  logging said preliminary regulatory analysis message in said write-once archive.

28. The method of claim 26,
wherein said step sending said preliminary regulatory analysis message is further comprised of the steps:
  processing said preliminary regulatory analysis message and a regulatory agent list containing at least one regulatory agent to create a selected regulatory agent;
  routing said preliminary regulatory analysis message to said selected regulatory agent to create a routed preliminary regulatory analysis message; and
  processing said routed preliminary regulatory analysis message by said selected regulatory agent to create said rule compliant preliminary message.

29. The method of claim 26,
wherein said step processing said routed preliminary regulatory analysis message is further comprised of the steps:
  reading said routed preliminary regulatory analysis message to create a preliminary analysis message reading; and
  reviewing said preliminary analysis message reading based upon said identified user and based upon said regulatory agent to create said rule compliant preliminary message.

30. The method of claim 29,
wherein said step reviewing said preliminary analysis message reading is further comprised of the step:
reviewing said preliminary analysis message reading based upon said identified user and based upon said regulatory agent accessing a regulatory rule base to create said rule compliant preliminary message.

31. The method of claim 30, wherein said selected regulatory agent is a software agent.

32. The method of claim 30,
wherein said step reviewing said preliminary analysis message reading is further comprised of the step:
said regulatory agent using said messaging interface to create said rule compliant preliminary message based upon said preliminary analysis message reading and based upon said identified user.

33. The method of claim 29, further comprising the steps of:
receiving a response request from said identified user to create a received response request from said identified user; and
routing said received response request from said identified user to said agent to create a routed response request from said identified user to said agent.

34. The method of claim 33,
wherein said step using said messaging interface to said agent is further comprised of the steps of:
reading said routed response request from said identified user to create a read response request from said identified user; and
generating said preliminary regulatory analysis message based upon said read response request from said identified user.

35. The method of claim 33,
wherein said step receiving said response request is further comprised of the step:
logging said received response request from said identified user in said write-once archive.

36. The method of claim 30,
wherein said step routing said received response request is further comprised of the steps:
analyzing said received response request from said identified user to create a response request category; and
examining an authorized agent collection of authorized agents based upon said response request category to select said agent.

37. The method of claim 36,
wherein said step examining said authorized agent collection is further comprised of the step:
examining an authorized agent collection of authorized agents based upon said response request category and based upon said received response request from said identified user to select said agent.

38. The method of claim 37,
wherein said step examining said authorized agent collection is further comprised of the steps:
determining an agent qualification based upon said response request category and based upon said received response request from said identified user; and
examining an authorized agent collection of authorized agents based upon said response request category and based upon said agent qualification and based upon said identified user to select said agent.

39. A program operating system composed of program code segments residing on a computer memory accessibly coupled to said computer of said computing system supporting said method of operating said computing system as recited in claim 25 comprised of the program code segments:
providing a messaging interface to said agent containing at least one field accessing a message queue based upon said agent to create said preliminary regulatory analysis message;
sending said preliminary regulatory analysis message to a regulatory analysis, engine to create a rule compliant preliminary message; and
sending said rule compliant preliminary message to at least one identified user to create a rule compliant sent message to said identified user.

40. A computing system supporting insuring compliance of a regulatory rule set for messages generated by at least one agent of an enterprise comprising:
at least one computer with accessibly coupled memory;
wherein a program operating system containing program code segments residing in said memory accessibly coupled to said computer, comprised of program code segments supporting:
providing a messaging interface to said agent containing at least one field accessing a message queue based upon said agent to create said preliminary regulatory analysis message;
sending said preliminary regulatory analysis message to regulatory analysis to create a rule compliant preliminary message; and
sending said rule compliant preliminary message to at least one identified user to create a rule compliant sent message to said identified user.

41. A process of making a regulatory analysis engine of an agent collection containing at least two agents of an enterprise for a regulation collection containing at least one regulation,
wherein said regulatory analysis engine containing a certification collection of at least one certification, a possible issue collection of at least two possible issues and a routing process for a regulatory compliance message with an associated issue collection of at least one issue to a message portal list containing at least a sent-out portal; and comprising the steps of:
extracting from said regulation collection to create said certification collection;
establishing from said regulation collection to create said possible issue collection; and
deriving from said regulation collection and from said certification collection and from said possible issue collection to create said routing process.

42. The process of claim 41,
wherein said certification collection contains a first certification and a second certification;
wherein said routing process for a regulatory compliance message with said associated issue collection containing exactly said first certification routes said regulatory compliance message to said agents of said enterprise having said first certification; and
wherein said routing process for said regulatory compliance message with said associated issue collection containing exactly said second certification routes said first regulatory compliance message to said agents of said enterprise having said second certification.

43. Said regulatory analysis engine as a product of said process of claim 41.

* * * * *